(12) United States Patent
Portman et al.

(10) Patent No.: US 7,640,006 B2
(45) Date of Patent: Dec. 29, 2009

(54) DIRECTORY ASSISTANCE WITH MULTI-MODAL MESSAGING

(75) Inventors: Eric A. Portman, Norcross, GA (US); Michael John Burgiss, Smyrna, GA (US)

(73) Assignee: Accenture Global Services GmbH, Schaffhausen (CH)

( * ) Notice: Subject to any disclaimer, the term of this patent is extended or adjusted under 35 U.S.C. 154(b) by 452 days.

(21) Appl. No.: 10/751,022

(22) Filed: Jan. 2, 2004

(65) Prior Publication Data

US 2004/0166832 A1   Aug. 26, 2004

Related U.S. Application Data

(63) Continuation-in-part of application No. 10/263,523, filed on Oct. 3, 2002, now Pat. No. 7,254,384, and a continuation-in-part of application No. 10/264,219, filed on Oct. 3, 2002, now Pat. No. 7,472,091.

(60) Provisional application No. 60/326,835, filed on Oct. 3, 2001, provisional application No. 60/326,827, filed on Oct. 3, 2001.

(51) Int. Cl.
*H04L 12/58* (2006.01)
(52) U.S. Cl. ................ 455/412.1; 455/412.2; 455/413; 455/414.1; 705/51; 379/88
(58) Field of Classification Search ............. 455/412.1, 455/414.1, 412.2, 413; 379/223, 201.01, 379/242, 88.01–88.28; 705/51
See application file for complete search history.

(56) References Cited

U.S. PATENT DOCUMENTS 5,561,769 A    10/1996   Kumar et al.

(Continued)

FOREIGN PATENT DOCUMENTS

DE    197 56 851 A1    7/1999

(Continued)

OTHER PUBLICATIONS

"Digital cellular telecommunications system (Phase 2+) (GSM); Universal Mobile Telecommunications System (UMTS); Functional stage 2 description of location services (3GPP TS 23.271 version 5.2.0 Release 5); ETSI TS 123 271" ETSI Standards, European Telecommunication Standards Institute; Sophia-Antipo, FR, vol. 3-SA2, No. V520, Mar. 2002 XP014007890.

(Continued)

*Primary Examiner*—Patrick N. Edouard
*Assistant Examiner*—Aung T Win
(74) *Attorney, Agent, or Firm*—Brinks Hofer Gilson & Lione

(57) ABSTRACT

A information assistance application is disclosed for use in a wireless communication environment. A requestor terminal is operable to generate a request for an information record associated with a subscriber terminal. The request is transmitted from the requestor terminal to an information assistance application server. The information assistance application server processes the request to determine the identity of the person for whom information has been requested and to determine how to contact the subscriber terminal. A message is generated and sent to the subscriber terminal requesting permission to provide the requester terminal with the requested information. If the subscriber terminal replies with an indication that the information may be provided, then the information application server generates a message that includes the information being requested and transmits it to the requestor terminal.

40 Claims, 10 Drawing Sheets

U.S. PATENT DOCUMENTS

| | | |
|---|---|---|
| 5,675,507 A | 10/1997 | Bobo, II |
| 5,764,762 A | 6/1998 | Kazmierczak et al. ......... 380/4 |
| 5,850,517 A | 12/1998 | Verkler et al. |
| 5,862,325 A | 1/1999 | Reed et al. ............ 395/200.31 |
| 5,870,549 A | 2/1999 | Bobo, II |
| 5,884,262 A | 3/1999 | Wise et al. ................. 704/270 |
| 5,905,736 A | 5/1999 | Ronen et al. ............... 370/546 |
| 5,920,835 A | 7/1999 | Huzenlaub et al. |
| 5,953,392 A | 9/1999 | Rhie et al. ............... 379/88.13 |
| 6,052,367 A | 4/2000 | Bowater et al. |
| 6,070,189 A | 5/2000 | Bender et al. |
| 6,119,167 A | 9/2000 | Boyle et al. |
| 6,138,158 A | 10/2000 | Boyle et al. |
| 6,157,941 A | 12/2000 | Verkler et al. |
| 6,161,139 A | 12/2000 | Win et al. |
| 6,173,259 B1 | 1/2001 | Bijl et al. .................... 704/235 |
| 6,181,781 B1 | 1/2001 | Porter et al. |
| 6,182,142 B1 | 1/2001 | Win et al. |
| 6,182,144 B1 | 1/2001 | England |
| 6,219,638 B1 | 4/2001 | Padmanabhan et al. |
| 6,236,768 B1 | 5/2001 | Rhodes et al. .............. 382/306 |
| 6,243,816 B1 | 6/2001 | Fang et al. .................. 713/202 |
| 6,249,291 B1 | 6/2001 | Popp et al. |
| 6,263,358 B1 | 7/2001 | Lee et al. |
| 6,282,270 B1 | 8/2001 | Porter |
| 6,301,245 B1 | 10/2001 | Luzeski et al. |
| 6,314,108 B1 | 11/2001 | Ramasubramani et al. |
| 6,333,973 B1 | 12/2001 | Smith et al. .............. 379/88.12 |
| 6,345,245 B1* | 2/2002 | Sugiyama et al. ............. 704/10 |
| 6,385,586 B1 | 5/2002 | Dietz ......................... 704/277 |
| 6,393,467 B1 | 5/2002 | Potvin |
| 6,449,344 B1* | 9/2002 | Goldfinger et al. ....... 379/88.17 |
| 6,453,337 B2 | 9/2002 | Miller et al. |
| 6,473,612 B1 | 10/2002 | Cox et al. |
| 6,483,899 B2 | 11/2002 | Agraharam et al. ...... 379/88.14 |
| 6,504,910 B1 | 1/2003 | Engelke et al. ................ 379/52 |
| 6,510,417 B1 | 1/2003 | Woods et al. ............... 704/275 |
| 6,513,003 B1 | 1/2003 | Angell et al. ............... 704/235 |
| 6,516,316 B1 | 2/2003 | Ramasubramani et al. |
| 6,523,063 B1 | 2/2003 | Miller et al. |
| 6,546,005 B1* | 4/2003 | Berkley et al. .............. 370/353 |
| 6,587,835 B1 | 7/2003 | Treyz et al. ................... 705/14 |
| 6,594,348 B1 | 7/2003 | Bjurstrom et al. ........ 379/88.13 |
| 6,598,018 B1 | 7/2003 | Junqua ....................... 704/251 |
| 6,647,257 B2 | 11/2003 | Owensby ................. 455/414.1 |
| 6,697,474 B1 | 2/2004 | Hanson et al. ......... 379/201.01 |
| 6,721,288 B1 | 4/2004 | King et al. |
| 6,725,252 B1 | 4/2004 | Himmel et al. |
| 6,728,758 B2 | 4/2004 | Sato |
| 6,742,022 B1 | 5/2004 | King et al. |
| 6,754,665 B1* | 6/2004 | Futagami et al. ............ 707/102 |
| 6,757,718 B1 | 6/2004 | Halverson et al. |
| 6,775,360 B2 | 8/2004 | Davidson et al. ......... 379/86.14 |
| 6,782,253 B1 | 8/2004 | Shteyn et al. ............ 455/414.1 |
| 6,782,419 B2 | 8/2004 | Tobita et al. |
| 6,816,835 B2 | 11/2004 | Hayashi ..................... 704/260 |
| 6,820,204 B1 | 11/2004 | Desai et al. |
| 6,826,407 B1 | 11/2004 | Helferich |
| 6,826,692 B1 | 11/2004 | White |
| 6,829,334 B1 | 12/2004 | Zirngibl et al. .......... 379/88.17 |
| 6,848,542 B2 | 2/2005 | Gailey et al. .................. 186/35 |
| 6,859,451 B1 | 2/2005 | Pasternack et al. |
| 6,895,084 B1 | 5/2005 | Saylor et al. ............. 379/88.22 |
| 6,907,112 B1 | 6/2005 | Guedalia et al. |
| 6,912,582 B2 | 6/2005 | Guo et al. |
| 6,925,307 B1 | 8/2005 | Mamdani et al. |
| 6,944,447 B2 | 9/2005 | Portman et al. .......... 455/422.1 |
| 6,950,947 B1 | 9/2005 | Purtell et al. |
| 7,003,082 B2* | 2/2006 | Engelke et al. ................ 379/52 |
| 7,020,251 B2 | 3/2006 | Zirngibl et al. |
| 7,233,655 B2 | 6/2007 | Gailey et al. ........... 379/210.01 |
| 7,254,384 B2 | 8/2007 | Gailey et al. ................ 455/412 |
| 7,441,016 B2 | 10/2008 | Gailey et al. ................ 709/219 |
| 7,472,091 B2 | 12/2008 | Gailey et al. .................. 705/51 |
| 2002/0004736 A1* | 1/2002 | Roundtree et al. ............ 705/10 |
| 2002/0035607 A1 | 3/2002 | Checkoway et al. |
| 2002/0049907 A1* | 4/2002 | Woods et al. ............... 713/182 |
| 2002/0055351 A1* | 5/2002 | Elsey et al. .................. 455/414 |
| 2002/0068551 A1* | 6/2002 | Strunk et al. ................ 455/414 |
| 2002/0091829 A1 | 7/2002 | Wood et al. |
| 2002/0107925 A1 | 8/2002 | Goldschneider et al. |
| 2002/0112007 A1 | 8/2002 | Wood et al. |
| 2002/0119793 A1 | 8/2002 | Hronek et al. |
| 2002/0137491 A1 | 9/2002 | Pentikainen et al. |
| 2003/0008661 A1 | 1/2003 | Joyce et al. |
| 2003/0065620 A1 | 4/2003 | Gailey et al. .................. 705/51 |
| 2003/0065749 A1 | 4/2003 | Gailey et al. ................ 709/219 |
| 2003/0078034 A1* | 4/2003 | Tsutsumi et al. ............ 455/412 |
| 2004/0054935 A1* | 3/2004 | Holvey et al. ............... 713/202 |
| 2004/0059790 A1* | 3/2004 | Austin-Lane et al. ....... 709/207 |
| 2004/0243417 A9 | 12/2004 | Pitts, III et al. ............. 704/276 |
| 2005/0020250 A1* | 1/2005 | Chaddha et al. .......... 455/414.1 |
| 2005/0027590 A9 | 2/2005 | Gailey et al. .................. 705/14 |
| 2005/0027591 A9 | 2/2005 | Gailey et al. .................. 705/14 |
| 2005/0102180 A1 | 5/2005 | Gailey et al. .................. 705/14 |
| 2005/0221812 A9 | 10/2005 | Gailey et al. ............. 455/422.1 |
| 2009/0083290 A1 | 3/2009 | Gailey et al. ................. 707/10 |
| 2009/0098862 A1 | 4/2009 | Gailey et al. ............. 455/414.1 |

FOREIGN PATENT DOCUMENTS

| | | |
|---|---|---|
| EP | 0 924 916 A2 | 6/1999 |
| WO | WO 99/55049 A1 | 10/1999 |
| WO | WO 00/17854 A1 | 3/2000 |
| WO | WO 01/69422 A2 | 9/2001 |

OTHER PUBLICATIONS

European Office Action dated Jun. 3, 2009 in European Patent Application No. 04804341.8.

Australian Office Action dated Nov. 19, 2008 in Australian Patent Application No. 2004313874.

International Search Report and Written Opinion dated Apr. 22, 2005 in International Patent Application No. PCT/EP2004/014752.

Digital cellular telecommunications system (Phase 2+); Universal Mobile Telecommunications System (UMTS); Location Services (LCS); Stage 1 (3GPP TS 22.071 version 5.2.0 Release 5); ETSI TS 122 071, ETSI Standards, European Telecommunication Standards Institute, Sophia Antipolis Cedex France, Sep. 2003, XP 014016349 (Corrected as to Date).

* cited by examiner

DIRECTORY ASSISTANCE WITH MULTI-MODAL MESSAGING

CONTINUATION DATA

This application claims priority from and is a continuation-in-part of application Ser. No. 10/263,523, filed Oct. 3, 2002, now U.S. Pat. No. 7,254,384 B2, issued Aug. 7, 2007 entitled Multi-Modal Messaging, which claims priority from U.S. application Ser. No. 60/326,835, filed Oct. 3, 2001, and U.S. application Ser. No. 10/264,219, filed Oct. 3, 2002 entitled Virtual Customer Database, which claims priority from U.S. application Ser. No. 60/326,827. The disclosures of the above-referenced applications are incorporated herein by reference in their entirety. In addition, the following commonly owned patents and patent applications are related to this application: U.S. patent application Ser. No. 10/263,566, filed Oct. 3, 2002, entitled SERVICE AUTHORIZER and U.S. Pat. No. 7,233,655 B2, issued Jun. 19, 2007, entitled MULTI-MODAL CALLBACK.

BACKGROUND OF THE INVENTION

1. Technical Field

The present invention relates generally to mobile and fixed communication and more particularly, to a method and system for communicating with terminals over an access network using multiple communication modes during a single interaction for the purpose of requesting permission from a user of a terminal for the release of information.

2. Related Art

Basic information assistance services have been available to users of standard telephone services for many years. While improvements have been made to these systems, such systems are still not suited for many users, including subscribers of wireless telephone services. Information assistance services for wireless terminal users is not widely accepted by users today because the vast majority of wireless terminal users are billed by the minute, regardless of who places the call. In other words, the calling party pays model is not used by wireless access providers and as such, users are typically billed for all of their air time or time used accessing the network.

In current information assistance services, a customer is typically connected with an operator and then verbally identifies the name and address of a party whose telephone number is desired. In the alternative, a customer may access a web site from a personal computer and manually enter search parameters into a search engine. This is not satisfactory because users of wireless terminals are often not near a computer terminal and wireless telephone numbers and other such information is typically not made available to the public. The operator or search engine then locates the number, using printed directories or a computer database, and provides the number to the customer.

A live operator sometimes provides the number to the person making the request. In addition, the number is sometimes provided through a synthesized voice response system that generates voice-based responses containing the number. After the customer's inquiry has been satisfied, the connection to the operator is typically cutoff or the customer is given the option of having the call connected for them. Simply put, the above-referenced systems are not very well adapted for use in a wireless communication environment.

Wireless terminal users often do not want their contact information given out to anyone who requests it. In other words, wireless terminal owners generally do not want their wireless telephone numbers or other contact information given out to just anyone who is capable of dialing information assistance. For these reasons, wireless information assistance is generally not made available to customers, especially in the United States. As such, a need exists for a wireless information assistance application that is capable of providing information assistance to users of wireless terminals, while at the same time providing the ability to protect the security and privacy of users of wireless terminals.

SUMMARY

The present invention discloses an information assistance application that is capable of providing wireless terminals with the ability to make an information assistance request for the purpose of allowing one user of a wireless terminal to obtain contact information associated with other individuals utilizing terminals. The information assistance application allows the owner and/or operator of a terminal to receive a notification when someone is requesting their respective contact information. The notification contains a reply indication that allows the owner of the terminal to respond to the request for contact information using their respective terminal. If the response is positive, the information assistance application will generate a response and send it to the requestor that contains the appropriate contact information. If the response is negative, the information assistance application will generate a response that indicates that the person they were attempting to obtain information from has declined their request.

The information assistance system disclosed by the present invention is preferentially designed for users of wireless terminals. One or more wireless service providers may be located in any geographic region. The present invention connects one or more wireless service providers to at least one information assistance application server that contains the information assistance application. Each of the terminals used in the present invention are preferentially wireless terminals that are operable or programmed to use various types of wireless services provided by the wireless service providers, however, one or more of the terminals may not be wireless terminals. In addition, preferentially each of the terminals used in the present invention are preferentially terminals that are capable of employing multi-modal messaging.

In one preferred embodiment of the present invention, the person making the request for contact information (referred to herein throughout as the "Requestor") may dial a special telephone number to access the information assistance application. In this embodiment, the Requestor may be connected to a computer telephony integration module of the information assistance application. The computer telephony integration module may route the call to a human operator that will fulfill the request being made by the Requestor. The human operator may be located at a computer terminal that may display the identity of the Requestor. Various types of information may be made available to the human operator about the Requestor such as, for example, a name, an address, a telephone number, a messenger identification, an email address and so forth.

In other embodiments, to access the information assistance application the Requestor may also locate and select a special link or icon stored in a menu-based system located on the terminal. Further, the Requestor may also have access to a browser-based application that allows the Requestor to gain access to the information assistance application through a web-enabled environment. For example, the Requestor may go to a website that hosts the information assistance application and make a request by entering information into input fields generated by the information assistance application on a web page. The Requestor may also generate a text-message based request that is sent to the information assistance application. It is also worth noting that a special button may be located on the terminal that causes the terminal to connect to the information assistance application as well.

Once the request is received by the information assistance application, it may be converted into a text request that the information assistance application can more easily handle and interpret to generate an appropriate response. The information assistance application may include a voice recognition module that may be used to interpret and identify words contained in spoken requests from Requestors and spoken responses from Subscribers. As such, the voice recognition module may be used to help convert spoken requests and replies into text messages that can be interpreted by the information assistance application. In addition, the information assistance application may also include a natural language processing module that is operable to take normal human phrases or speech and generate appropriate database searches based on normally spoken speech or dialogue. In the case of the computer telephony integration embodiment, a human operator at a terminal may interpret or take the request from the Requestor and enter an appropriate search into appropriate search fields generated on the computer terminal.

The information assistance application may include a permission module that may be used to process each request from a Requestor. The permission module may determine if the Requestor is authorized to make a request. A voice print module may be included that compares a voice print of the Requestor with a known voiceprint of the owner of the terminal to determine if the Requestor is authentic. If the Requestor is authentic, the request may be processed by the information assistance application and if not, the request may be rejected. In addition, a requestor identification module may be used to determine the identity of the Requestor. The identity of the request may be part of the message that is generated and sent to the owner of the terminal for whom information is being requested.

As generally set forth above, the information assistance application is operable to determine the identity of the person for whom information is being requested. The information assistance application may have access to a subscriber database that contains this information or it may access a virtual customer database system. A voice recognition module and a natural language processing module may be used to determine the identity of the person. In addition, the information assistance application may also include a text-based message module that is used to interpret incoming requests that are received from Requestors in the form of text-based messages. Once the information assistance application determines the identity of the Subscriber for whom information is sought, the permission module may generate a message that is sent to the Subscriber. Preferentially, the message is a multi-modal message, meaning the message is sent to the Subscriber's terminal using multiple message formats.

The message that is sent to the Subscriber contains a method by which the Subscriber may reply to the message. As an example, the Subscriber may be asked to press a key, select an icon or say a predetermined word to grant the information assistance application permission to provide the Requestor with the information being requested. In addition, the message that is sent to the Subscriber may also include contact information or data associated with the Requestor. As such, the message may include the Requestor's name, telephone numbers, email address(es), fax numbers, messenger identification, and so forth. The Subscriber may also be provided with an option to allow the Subscriber to save the Requestor's information in a database of contacts contained on their terminal. In addition, the Subscriber may also be provided with an option that allows them to determine the type of contact information or data that will be given to the Requestor.

The Subscriber may be given the option on their respective terminal to indicate whether or not the information being requested by the Requestor should be forwarded to the Requestor's terminal. If the Subscriber grants the request, the permission module of the information assistance application may determine the type of information the Subscriber has authorized to be made available by the system. A subscriber preference module of the information assistance application may be used to determine the type of data that the information assistance application is allowed to turn over or be made available to the Requestor. In addition, the permission module may interpret the reply from the Subscriber to determine the type of data to be given to the Requestor as the message to the Subscriber may contain an option that allows the Subscriber to indicate what information may be given to the Requestor.

The response sent to the Requestor's terminal is preferentially in the form of a multi-modal message. For example, the information assistance application may generate a response to the Requestor that causes the Requestor's terminal to ring and when answered, to generate a spoken statement that states: "Your request for John Smith's contact information has been approved, please see your screen for the information you requested." The information assistance application may also generate a text-based message at the same time that is sent to the Requestor's terminal that contains the requested information or information that has been authorized for release by the Subscriber. The response may be in several formats, such as for example, a voice-based response, a text-based response, an email, a voice-mail, a fax, an instant message and so forth. The response may also be in a format that is capable of automatically being stored in a contact information or personal information management ("PIM") application located on the terminal.

For the purpose of the present invention, it is important to note that all of the software components or modules discussed herein may be used in combination with other modules. Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Multi-Modal Messaging

Figure 1:
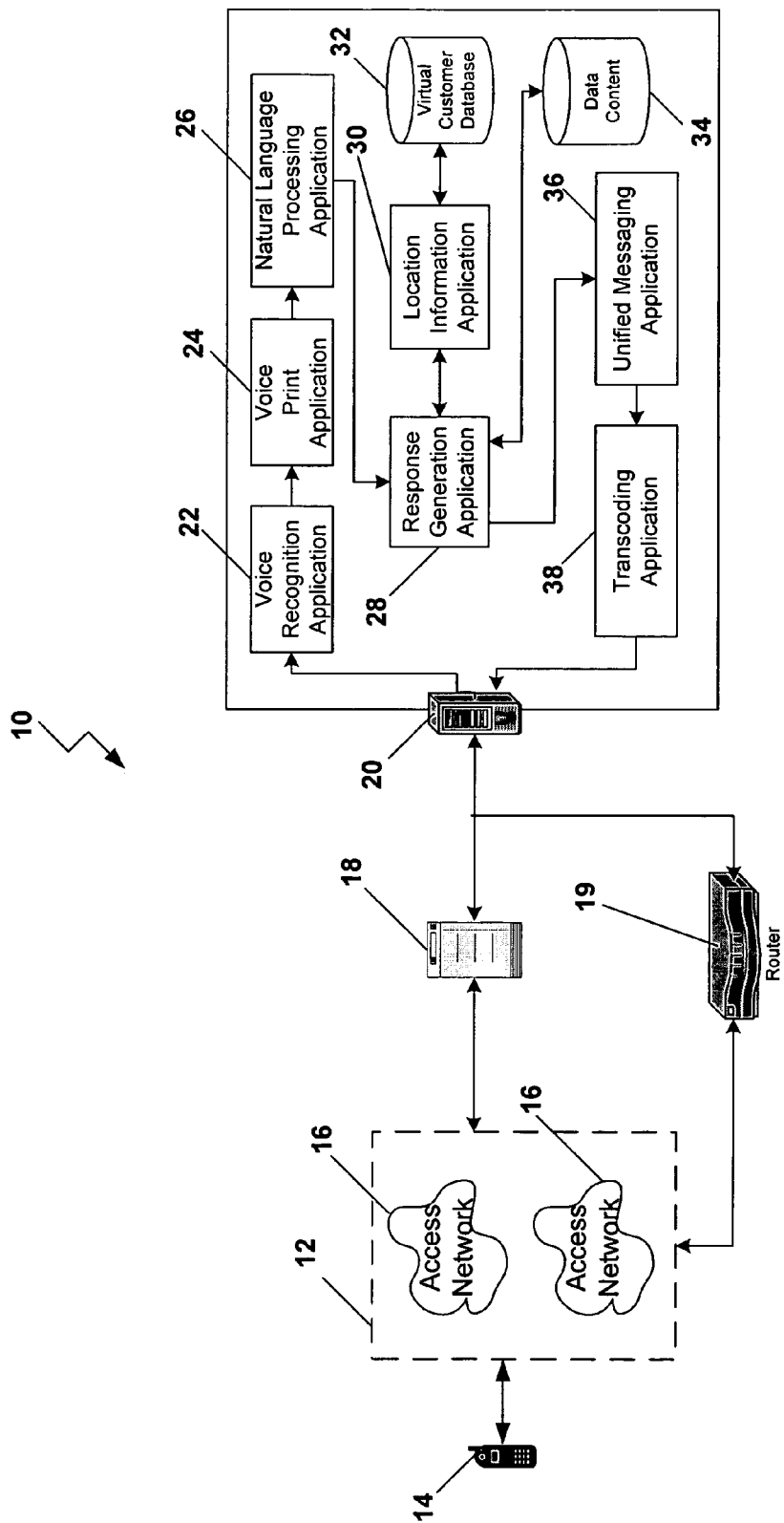
FIG. 1 illustrates a preferred embodiment of a multi-modal messaging system for a wireless communication system.

Referring to FIG. 1, the present invention discloses a multi-modal messaging system 10 for a wireless communication system 12 is illustrated. The wireless communication system 12 includes at least one wireless terminal 14 that is connected to at least one wireless access network 16. Although not illustrated, the wireless access network 16 generally includes a base station transceiver that is connected to a base station server. The base station server is connected to a network connection that may be a publicly switched telephone network or a private network. In the embodiment illustrated in FIG. 1, the wireless access network 16 is connected to at least one switch 18, thereby connecting the wireless terminal 14 to a multi-modal message server 20. However, as further illustrated in FIG. 1, the wireless access network 16 could also be connected to a router 19 in an IP-based wireless access network as the function of transferring data between the wireless terminal 14 and the multi-modal message server 20 is provided by both types of devices.

The multi-modal messaging system 10 discloses a method of communicating with a wireless terminal 14 using multiple modes of communication including, but not limited to, human speech and text-based messages during a single transaction or call. As set forth in detail below, wireless terminals 14 that are connected to the wireless access network 16 preferentially communicate with the multi-modal message server 20 via the wireless access network 16 to which the wireless terminal 14 is connected. The multi-modal messaging system 10 also includes an automated speech recognition application with which the user of the wireless terminal 14 interacts to request and receive information from various databases containing information from a plurality of businesses.

Referring to FIG. 1, during operation the wireless terminal 14 is capable of transmitting and receiving messages that may come in several formats. The formats include human speech, which is produced using a speaker and a microphone, and text and graphic formats that are generated on a display of the wireless terminal 14. The wireless terminal 14 preferentially transmits a tailored request for information to the multi-modal message server 20 in either human speech or text based message formats. Speech-based tailored requests for information are transmitted by means of a wireless telephone call as known in the art. Text-based tailored requests for information are transmitted in the form of a text message that is transmitted using a wireless communication protocol, including but not limited to a short message service ("SMS"), any wireless application protocol ("WAP"), or any email protocol.

A user of the wireless terminal 14 establishes a connection with the multi-modal message server 20 by dialing a phone number that is associated with a participating company that operates the multi-modal message server 20. The act of dialing a predefined phone number associated with the multi-modal message server 20 causes the wireless access network 16 to connect the call to the multi-modal message server 20. The user of the wireless terminal 14 is capable of establishing a connection with the multi-modal message server 20 from an interactive menu that is generated on the wireless terminal 14 through a wireless application protocol or by predefined user or factory settings. Selecting a link or prompt to a respective multi-modal message server 20 contained in the interaction menu thereby establishes the connection between the remote terminal 14 and the multi-modal message server 20. The user may enter an address or universal resource locator ("URL") of the multi-modal message server 20 to establish the connection between the wireless terminal 14 and the multi-modal message server 20.

Although not specifically illustrated, the operator of the multi-modal message server 20 may or may not be the actual company from which data is sought by the user of the wireless terminal 14. The company operating the multi-modal message server 20 may be a third-party that is licensed or granted permission to provide certain types of data to consumers having remote terminals 14 that are associated with the company operating the multi-modal messaging system 10. For example, the provider of the wireless communication system 12 may have a contract with the operator of the multi-modal message server 20 and in turn, another company from which the user is seeking information may also have a contract with the operator of multi-modal message server 20. The cooperation of all parties enables the multi-modal messaging system 10 to function properly despite the varying types of contractual arrangements made between respective parties. Further, the multi-modal message server 20 may house the data files that contain the information requested by the user or the multi-modal message server 20 may be connected to several different company file servers that contain the desired information that is responsive to the requests for information that are generated by the wireless terminals 14.

In response to the requests for information that are generated by the wireless terminal 14, the multi-modal message server 20 generates structured responses that contain data that is responsive to the requests for information. In transmitting the structured responses to the wireless terminal 14, the multi-modal messaging system 10 can select from a group of modes of communication including, but not limited to, text modes, graphic modes, animation modes, multi-media modes, pre-recorded and synthesized sounds including synthesized human speech modes, music modes, and noise modes. In particular, the multi-modal messaging system 10 uses at least two of the above-referenced modes to transmit responses to the wireless terminals 14 during a single transaction or user interaction.

As set forth above, the methods and protocols for transmitting information in the form of text from the multi-modal messaging system 10 to the wireless terminal 14 include, but are not limited to, SMSs, WAPs, and email protocols. In the case of audible information, the response is preferentially transmitted from the multi-modal message server 20 to the remote terminal 14 during a wireless telephone call that may be initiated by either the remote terminal 14 or the multi-modal message server 20. The audible information contained in a response may be transmitted in an automated fashion using applications capable of synthesizing human speech and directing the synthesized human speech to a voice mail system associated with the intended recipient's wireless terminal 14. As used herein, the term voice mail system includes any system that is capable of receiving, storing and retrieving audible messages in an automated fashion either autonomously or on-demand via a telephone network. These include voice mail servers and both analog and digital answering machines.

As set forth above, the multi-modal messaging system 10 discloses the use of more than one mode of communication during the course of a single interaction between the wireless terminal 14 and the multi-modal message server 20. A single interaction is defined as a set of messages required to meet the needs of a consumer or user of the wireless terminal 14 that is requesting a specific service, specific content, or specific information from the multi-modal message server 20 and the response or responses that are delivered by the multi-modal message server 20 in response to the requests for information from the wireless terminal 14. The multi-modal messaging system 10 discloses methods of using multiple modes of communication between a respective remote terminal 14 and a respective multi-modal message server 20 during a single interaction, thereby allowing the multi-modal message server 20 to respond to the demands of the user using both voice and text-based messages, for example.

As set forth above, during operation the wireless terminal 14 is operable to generate tailored requests for information about a particular product or service. The multi-modal message server 20 responds to the wireless terminal 14 by sending content responsive to the tailored requests for information via messages that are formatted as a text-based message and a voice-based message. The wireless terminal 14 may only be capable of conducting a wireless telephone call or the transmission or receipt of text messages, but not both operations at the same time. As such, in these examples, the multi-modal messaging system 10 is designed to provide the wireless terminal 14 with text-based messages that are responsive to the requests for information after the wireless telephone call has been disconnected and the user has already received the voice-based messages that are responsive to the requests for information. In addition, the voice call connection between the wireless terminal 14 and the multi-modal message server 20 and the text-based messages that are sent to the wireless terminal 14 may be transmitted from the multi-modal message server 20 using a dissimilar wireless communication protocol.

The multi-modal messaging system 10 preferentially also includes a voice recognition application 22. The voice recognition application 22 is preferentially located on the multi-modal message server 20, but may also be located on a separate server that is connected with the multi-modal message server 20. The voice recognition application 22 determines the identity of or recognizes respective words that are contained in voice-based requests for information that are generated by users of the wireless terminal 14. The words that are identified by the voice recognition application 22 are used as inputs to a response generation application 28 in one preferred embodiment of the present invention. As set forth in greater detail below, the response generation application 28 is capable of generating multi-modal responses that contain data responsive to the requests for information that are generated by the users of the wireless terminal 14. As further set forth in detail below, the words that are identified may also be used as an input to a natural language processing application 26 that determines the intent of the words contained in the requests for information and not just the identity of the words.

The multi-modal messaging system 10 may include a voice print application 24 that provides security to users of the wireless terminals 14 by analyzing voice prints of the user that are obtained by sampling segments of the user's speech. If the user is authenticated, access to the multi-modal messaging service 10 is provided to the user and if the user is not authenticated access is denied. Further, if the user desires to limit access to the multi-modal messaging system 10 to only themselves or select individuals, then a preference setting may be set by the owner of the wireless terminal 14 that restricts access to only pre-authorized users.

The voice print application 24 can also be used to limit use of the wireless terminal 14 so that if the remote terminal 14 is stolen it will not be able to be used by the person who steals the wireless terminal 14. The voice print application 24 can also be used to determine if the user is an authorized user that can be provided with information related to a specific account by providing authorization and authentication. The voice print application 24 can be located on the multi-modal message server 20 or on a voice print application server that is connected to the multi-modal message server 20.

As briefly set forth above, the multi-modal messaging system may 10 include a natural language processing application 26. The natural language processing application 26 works in conjunction with the voice recognition application 22 to ascertain the meaning of natural language requests for information that are received from the wireless terminals 14. The natural language processing application 26 processes the identified words contained in the voice signals to ascertain the meaning or intent of the words that are contained in the voice signals. As such, during operation the voice recognition application 22 identifies or recognizes the particular words that are contained in the voice signals and the natural language processing application 26 interprets the meaning or intent of the recognized words contained in the voice signals. The natural language processing application 26 provides functionality to the multi-modal messaging system 10 that allows users to enter requests for information using natural language that is normally used in conversations between two human subjects.

The natural language processing application 26 may be located on the multi-modal message server 20, but, in an effort to increase the level of performance, could also be located on a separate server or a separate set of servers connected with the multi-modal message server 20. For a more detailed discussion of the natural language processing application please refer to U.S. application Ser. No. 10/131,898 entitled Natural Language Processing for a Location-Based Services System filed on Apr. 25, 2002 which is hereby incorporated by reference in its entirety.

As illustrated in FIG. 1, the natural language processing application 26 is connected to a response generation application 28 that uses a plurality of programmed rules in combination with the command or word contained in the request to determine what information should be retrieved and returned to the wireless terminal 14. The response generation application 28 uses the words identified by the voice recognition application 22 and the intent or meaning of the words determined by the natural language processing application 26 to generate a search query that retrieves the appropriate information from a content database 34. In other embodiments, only the words identified from the voice recognition application 22 are used by the response generation application 28 to generate a response to the tailored requests for information.

A location information application 30 may be used to determine a geographic location of the wireless terminal 14. The location information application 30 may be located on the multi-modal message server 20 or on another server that is connected to the multi-modal message server 20. The geographic location of the user can be used to focus or narrow responses that are generated by the response generation application 28 to a specific geographic area that is appropriate to the user of the wireless terminal 14. Certain types of requests for information generated by users of the wireless terminals 14 will be dependent on the current geographic location of the wireless terminal 14 and the location information application 30 is used to provide the response generation application 28 with location data that is needed to generate a geographically tailored response to requests for information that are dependent on the geographic location of the wireless terminal 14.

The response generation application 28 may also be connected to a virtual customer database 32 that may use application and customer proprietary information to determine user preferences for modes of communication. In addition, the virtual customer database 32 may include customer data that includes information about the wireless terminal 14 that the user is using such as limitations for the amount or type of data content that the wireless terminal 14 can receive or the type of display used by the wireless terminal 14 so that responses can be structured in a format that is compatible with the display. In addition, the user may choose not to receive certain types of large files, such as multimedia files and so forth, and these settings may be found in the virtual customer database 32 in the profile of the user.

As set forth above, the response generation application 28 is used to generate structured responses to the tailored requests for information that are generated by the wireless terminal 14. Once the customer preferences and identification have been determined using the virtual customer database 32 and possibly the geographic location of the wireless terminal 14 has been determined using the location information application 30, a query is generated and sent to the content database 34 that is connected to the response generation application 28. The query is used to retrieve data that is responsive to the request for information from the content database 34. The content database 34 may be located locally on the multi-modal message server 20 or housed on other servers that are connected to the multi-modal message server 20. For example, if the wireless terminal 14 is connected to a multi-modal message server 20 provided by an airline company, the details of a flight that a user is booked on may be retrieved from the content database 34 if so desired.

Expanding on the example set forth above, let's say that the user of the wireless terminal 14 is a regular customer of the airline company and is registered with the airline company. The virtual customer database 32 will know this fact and will assist the response generation application 28 by providing detailed information to the response generation application 28 about that particular user. For example, the virtual customer database 32 may contain a customer identification number and a virtual key that is associated with that particular user. This information can be added to the query that is generated by the response generation application 28, which allows the response generation application to more accurately generate responses. The airline company multi-modal messaging system will be able to use this information to more accurately provide responses to the user that contain accurate data related to that particular user's account and status. Further, this information can be used for authorization and authentication purposes.

Once the data for the response to the user's request has been located by the response generation application 28, the multi-modal messaging system 10 prepares this data for transmission to the wireless terminal 14. A unified messaging application 36 preferentially combines the information retrieved into a unified response that can be sent to the wireless terminal 14 if the response generation application 28 does not format the response into the predefined message formats. The unified response that is generated contains a text-based response and a voice-based response that is created using the data that is provided by the response generation application 28. In essence, the unified message application 36 prepares the multi-modal response by generating a response in at least two formats that are suitable for the wireless terminal 14. As set forth above, these formats may include a text-based message, a graphics-based message, a voicemail message, and an email message.

After the unified message is created, a transcoding application 38 may be used to format the unified message into a format that is suitable for the wireless terminal 14 using information already known about the wireless terminal 14, which is preferentially retrieved from the virtual customer database 32. For example, for a text-based message, the transcoding application 38 may convert the text-based response into an SMS or WAP format. For a voice-based message, the transcoding application 38 may use a voice synthesis application to convert the speech-based response into a format suitable for the wireless terminal 14. The response is then sent to the wireless access network 16, which thereby transmits the multi-modal response to the wireless terminal 14.

Users of the wireless terminals 14 can define how they want the multi-modal messaging system 10 to send responses to them, or the multi-modal messaging system 10 may contain information, preferably stored in the virtual customer database 32, about each user of the multi-modal messaging system 10 and their respective remote terminals 14. This allows the multi-modal messaging system 10 to generate and transmit responses that are in the preferred format of the user. The multi-modal messaging system 10 allows users to determine what types of services and modes of communication will be used to transmit responses to the wireless terminal 14.

Referring to FIG. 1, a call may be placed on the wireless access network 16 from the wireless terminal 14 to the multi-modal message server 20. In other preferred embodiments, a connection may be established between the wireless terminal 14 and the multi-modal message server 20 through the selection of a menu item or the entry of an address on the wireless terminal 14. The wireless terminal 14 also preferentially passes information to the multi-modal message server 20 about the wireless terminal 14 using SS7, ISDN, or other in-band or out-of-band messaging protocols. A calling number identification ("CNI") may be passed as well as a serial number for the wireless terminal 14. This information can be used to determine the identity of the user to which the wireless terminal 14 belongs.

The multi-modal message server 20 uses an interface to detect the call and 'answers' the call from the wireless terminal 14 using text-to-speech messages or recorded speech prompts. The prompts can ask the user to speak the request for information using some set of predefined commands or may ask the user to utter the request for information using natural language, which will later be processed by the voice recognition application 22 and the natural language application 26. The text-to-speech messages or recorded speech prompts are transmitted across the wireless access network 16 to the wireless terminal 14.

During operation, the user speaks the request for information into the wireless terminal 14 and the wireless terminal 14 and wireless access network 16 transmit the voice signal representing the request for information to the multi-modal message server 20. Under one mode of operation, the user speaks one of a pre-defined command phrases or words, which is then interpreted and used by the voice recognition application 22 to generate a response. The user's speech is converted to text using the voice recognition application 22, which is then used as an input to a search query that interprets the user's command. As set forth below, based on the user's command, a response is generated by the responses generation application 28 that is sent to the user.

The multi-modal messaging system 10 may incorporate a voice printing application 24 in conjunction with the database of proprietary customer information 34 to determine if the caller using the wireless terminal 14 is the owner of (or assigned to) the wireless terminal 14. If the caller is not the owner of the wireless terminal 14, (which may occur if someone borrows the wireless terminal 14 from the owner) the multi-modal messaging system 10 proceeds with the call but does not personalize any of the services based on proprietary customer information associated with the assigned user. Therefore, at any point in the process where the multi-modal messaging system 10 would use customer proprietary information, the multi-modal messaging system 10 could use additional prompts to request this information from the caller. The multi-modal messaging system 10 could also restrict access to the multi-modal messaging system 10 and the wireless terminal 14 altogether if the assigned user has preset a user preference indicating the restriction of access to unauthorized users.

The multi-modal messaging system 10 can handle requests for information that are entered using natural speech. In this embodiment, the multi-modal messaging system 10 passes the text identified from the voice recognition application 22 to a natural language processing application 26 that is used to determine the intent or meaning of the words contained in the request. The interpreted intent is processed by the multi-modal messaging system 10 in the same way the pre-defined commands are processed. This is made possible because the natural language processing application 26 is programmed to generate search queries based on the words identified in the request and the intent of the words contained in the request.

The response generation application 28 uses programmed rules in combination with the commands to determine what information should be retrieved and returned to the wireless terminal 14. These rules are stored in executable code or in a content database 34. If the multi-modal messaging system 10 determines that location information about the wireless terminal 14 is necessary to generate an appropriate response to the request for information, the multi-modal messaging system 10 uses the location information application 30 to determine the geographic location of the wireless terminal 14. The wireless access network 16 can use several location determining applications that are designed to sufficiently determine the geographic location of the wireless terminal 14 to the accuracy necessary to successfully generate a response that is responsive to the request for information. The location information that is generated by the location information application 30 is used as part of the search query that is used to locate the desired information.

Upon determining the data to be returned to the wireless terminal 14 and retrieving this data from a content database 34, the response generation application 28 of the multi-modal messaging system 10 prepares the content to be sent to the wireless terminal 14. The multi-modal messaging system 10 may use an application and customer proprietary information to determine the customer's preferences for modes of communication. Additionally, this customer data may include information about the wireless terminal 14 assigned to the user such as limitations for the amount or type of data content the device can receive. These methods for storing and accessing the customer proprietary data include those disclosed in a co-pending application entitled Virtual Customer Database, which was filed on Oct. 3, 2002, and assigned application Ser. No. 10/264,219, which is hereby incorporated by reference in its entirety.

The multi-modal messaging system 10 formats the content contained in the response for the wireless terminal 14 using available information about the wireless terminal 14 and individual preferences of the users. A unified messaging application 36 preferentially formats the content into multiple messages, if necessary, to respond to the wireless terminal 14 in the most informative way that is compatible with the wireless terminal 14 to which the user is assigned or has purchased. The multi-modal messaging system 10 may use a transcoding application 38 to format the content contained in the response into a suitable format for the user's wireless terminal 14 and is capable of generating responses using formats such as WML, HTML, and plain text.

The multi-modal messaging system 10 then transmits the content to the wireless access network 16 operated by the carrier and indicates the recipient and the method for transferring the message(s) to the recipient or user. The messages may be sent as a text message to the wireless terminal 14 using any of (but not limited to) the following: SMS, CPDP, Mobitex. The wireless terminal 14 receives the message(s) and the user is allowed to interact with the content contained in the response from the multi-modal messaging system 10.

The multi-modal messaging system 10 may be used in combination with a location-based services system where the content of the messages between the system and the wireless terminal 14 contain information that is based on the current geographic location of the wireless terminal 14. The location-based services system may be of the type by which the indicator of the location of the wireless terminal 14 is generated by the wireless terminal 14 and transmitted to the multi-modal messaging system 10, determined by the multi-modal messaging system 10, or by some combination thereof. For a more detailed description of location-based service systems, refer to U.S. application Ser. No. 09/946,111, which was filed on Sep. 4, 2002 entitled Location-Based Services and is hereby incorporated by reference in its entirety.

Figure 2:
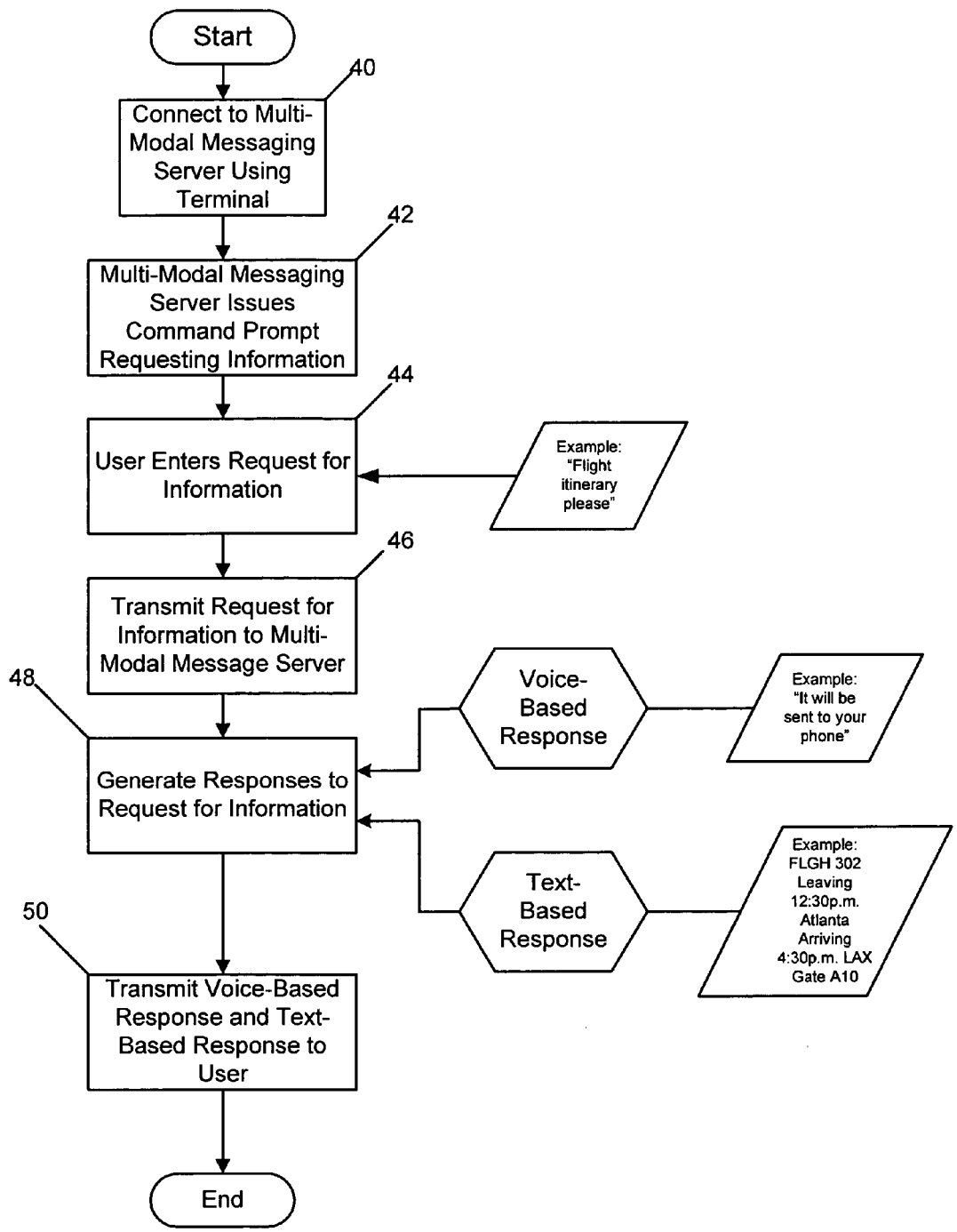
FIG. 2 illustrates the general process steps performed by a preferred embodiment of the multi-modal messaging system during an illustrative operation.

Referring to FIG. 2, an illustrative example of the multi-modal messaging system 10 is set forth below. As an example, let's say that a user of wireless terminal 14 is planning a trip and would like to check with his or her airline to determine their flight itinerary. At step 40 the user of wireless terminal 14 connects to the multi-modal messaging system 10 of the airline through the wireless access network 16. At step 42, the multi-modal messaging server 20 transmits a command prompt to the user requesting information from the user of the wireless terminal 14. In response, at step 44 the user states a voice request for information, which in this example is illustrated as "Flight itinerary please", which is transmitted to the multi-modal messaging server 20 at step 46.

At step 48, the multi-modal messaging system 10 takes this voice request for information and uses automated speech recognition, which in the preferred embodiment includes processing the voice request for information with a voice recognition application 22 and a natural language processing application 26, to generate a plurality of responses to the request for information. As an example, in the embodiment illustrated in FIG. 2, a voice-based response is generated that states, "It will be sent to your phone" and a text-based response is generated that provides the user with the appropriate itinerary information that is tailored for that particular user. At step 50, the multi-modal message server 20 transmits the multi-modal response to the user, which in FIG. 2 is represented as a voice-based response and a text-based response.

To generate the response, the multi-modal messaging system 10 uses customer information that is received from the virtual customer database 32 to determine that the user of the wireless terminal 14 has a profile with the airline. The profile is capable of providing the user's customer ID and possibly a virtual key that is associated with that customer that authorizes the wireless terminal 14 to receive data from the airline's database. This information allows the multi-modal messaging system 10 to authenticate and identify the user of the wireless terminal 14 in order to generate an appropriate response from the airline's data files.

The wireless terminal 14 is also capable of responding to the multi-modal message. The user of the wireless terminal 14 can respond to the multi-modal message using several different response methods including voice, keypad selections, touchscreen selections and so forth. In response to the user's response, the multi-modal message server 20 is capable of generating another multi-modal message that may be sent to the wireless terminal 14. For example, a text response sent to the wireless terminal 14 states "Your flight leaves at 5 pm and your seat is 45B. An upgrade to 1st class is available. Reply to this message for more information." By replying to the message, the multi-modal message server 20 can generate another multi-modal message that provides the details of upgrading to first class. Other scenarios are available and the above-referenced example should be construed as illustrative and not in a restrictive sense.

Virtual Customer Database

The invention includes methods and systems for creating and utilizing a distributed database of customer information. The distributed database may be used to deliver personalized services to consumers using electronic communication channels. The distributed database is enabled through a loose association of customer specific information from participating businesses that may include companies, content providers etc., in order to enable broad profiles of consumers. The customer specific information of each participating business may be securely maintained by that participating business, but may be enabled for real-time external access by consumers using a virtual customer database system. Accordingly, broad consumer profiles may be created within the virtual customer database system without requiring disclosure to third parties and/or direct sharing of consumer information between participating businesses.

Figure 3:
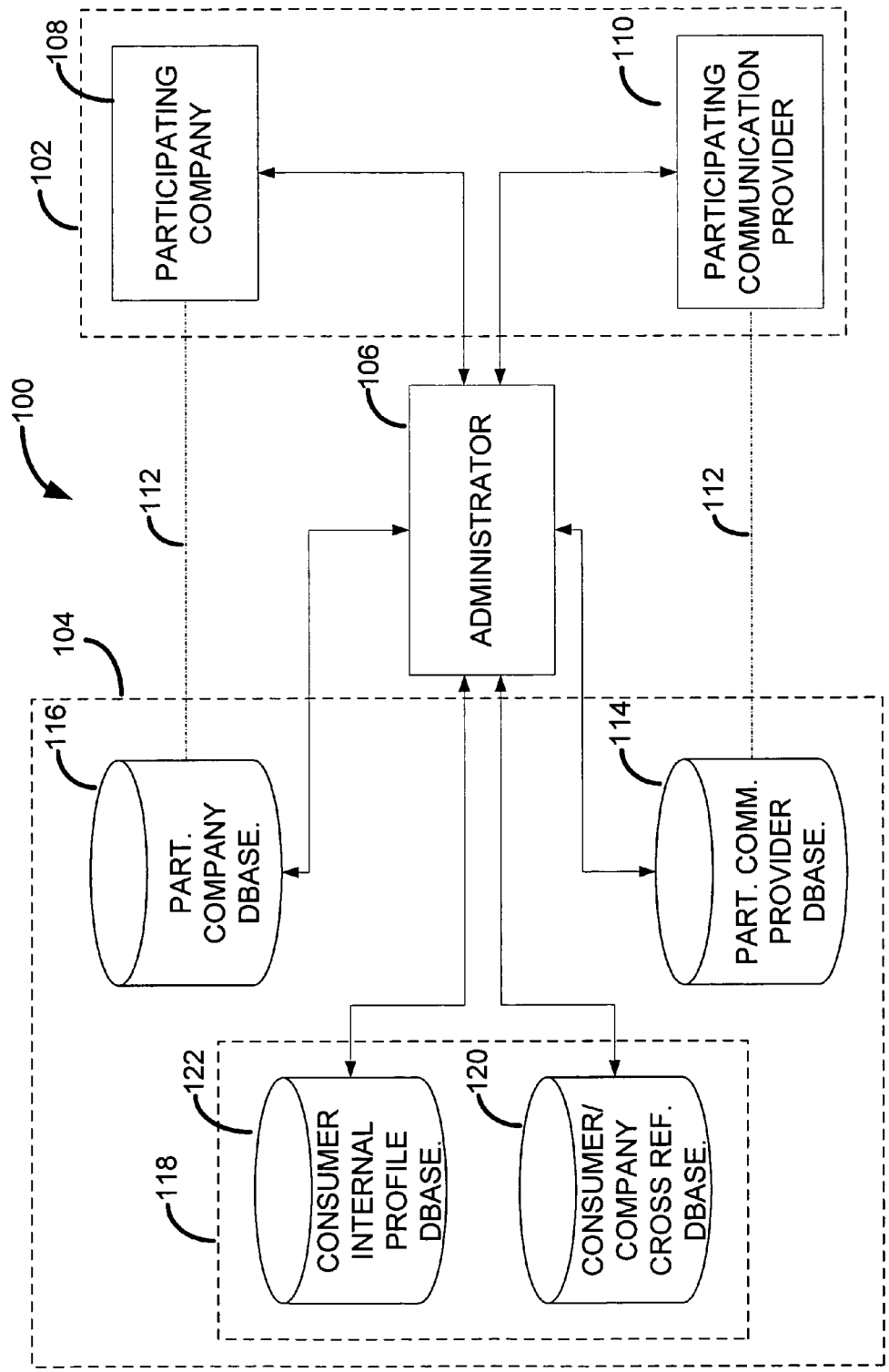
FIG. 3 illustrates an example of the virtual customer database (VCDB) system.

FIG. 3 is a block diagram illustrating one example of a virtual customer database (VCDB) system 100. The VCDB system 100 includes a plurality of participating businesses 102, a distributed database 104 and an administrator 106 coupled as illustrated. As used herein, the term "coupled", "connected", or "interconnected" may mean electrically coupled, optically coupled, wirelessly coupled and/or any other form of coupling providing an interface between systems, devices and/or components.

The participating businesses 102 represent information-based systems of businesses providing goods and/or services to consumers. The information-based systems may include customer data storage systems, data retrieval systems, communication systems and/or any other systems supporting customer record keeping related to the supply of goods and/or services. The data stored in such systems may include any form of customer specific data related to providing goods and/or services to each consumer. Typically, the participating businesses 102 are protected from unauthorized access by a firewall or other security measures. As used herein, the term "consumer" refers to users of the VCDB system 100 for personalized services. The term "customer" on the other hand, refers to information and services related to consumption/utilization of goods and/or services by such consumers.

In the illustrated example, the participating businesses 102 may include at least one participating company 108 and at least one participating communication provider 110. The participating company 108 may be any independent company, such as, for example, an airline company, a manufacturing company, a utility company or any other business providing goods and/or services to consumers. The participating communication provider 110 may be any business providing communication services to consumers, such as, for example, a wireless phone service provider, a wireline phone service provider, a paging service provider, an email service provider, an interactive messaging provider, an Internet access provider or any other provider of communication services over electronic communication channels. In other examples any number of participating companies and participating communication providers may be included in the participating businesses 102 of the VCDB system 100.

The distributed database 104 may include one or more secure databases accessible by one or more database management systems (DBMS). The distributed database 104 includes separate, secure, participating business databases for each of the participating businesses 102. The participating business databases may each include customer specific information extracted from associated participating businesses 102. As illustrated by dashed lines 112 in FIG. 3, a first database identified as a participating communication provider database 114 is preferably associated with the participating communication provider 110. In addition, a second database identified as a participating company database 116 is preferably associated with the participating company 108. Alternatively, the participating communication provider database 114 and the participating company database 116 may be included along with any other participating businesses 102 in a common secure database. Within the common secure database, passwords or other security measures may be used to limit access to the different areas of the database pertaining to each of the participating businesses 102.

The distributed database 104 may also include a third database identified as a shared participant database 118. The shared participant database 118 is at least one database common to all of the participating businesses 102. Non-sensitive information related to each of the participating businesses 102 may be included in the shared participant database 118. In addition, administrative and operating information related to the VCDB system 100 may be included in the shared participant database 118. For example, account information related to consumers subscribing to the personalized services of the VCDB system 100, consumer utilization information, consumer customization of personalized services and/or any other consumer information related to the VCDB system 100 may be included.

The shared participant database 108 of the illustrated example includes a consumer/company cross-reference database 120 cooperatively operating with a consumer internal profile database 122. The shared participant database 118 may include non-sensitive general information related to each of the participating businesses 102. In addition, the shared participant database 118 may include consumer specific information for each consumer. The shared participant database 118 may also include any other information related to operation of the VCDB system 100 in providing personalized services to consumers. The consumer/company cross reference database 120 and the consumer internal profile database 122 may be collocated in the same database, or may be two separate databases operating on the same, or different, hardware platforms.

The consumer/company cross reference database 120 may include information to cross reference each of the participating businesses 102 to corresponding consumers utilizing the VCDB system 100. Consumers utilizing goods and services of the participating businesses 102 may be cross-referenced to corresponding company IDs within the shared participant database 118. The company IDs may be the name of the company from which the information was extracted, a code representing the company and/or any other form of unique identifier. In addition, the consumer/company cross reference database 120 may include any other information pertaining to associating consumers with the participating businesses 102.

The consumer internal profile database 122 may include information related to each consumer enabled to utilize the VCDB system 100. The consumer related information may be selectively associated with individual company IDs and may include a consumer's name and address (past and present) as well as consumer specific contact information and pre-determined contact parameters. The consumer specific contact information may identify electronic communication channels for delivery of personalized services based on the pre-determined contact parameters. The electronic communication channels may be identified by associating communication device(s) of each consumer with company ID(s) of the participating communication provider(s) 110. The pre-determined contact parameters may include, for example, time period designations, content designations, originator designations, preference rankings or any other considerations related to utilization of the contact information.

For example, the consumer specific contact information may indicate three electronic communication channels utilized by a wireless phone, a pager and a PDA, each serviced by a different one of the participating businesses 102 identified with a company ID. In addition, pre-determined contact parameters may identify the pager as the first choice for daytime delivery of personalized services and the wireless phone as the first choice for nighttime delivery. Further, the pager may be identified to receive text messages from one of the participating businesses 102 while the PDA may be identified to receive multimedia messages from another of the participating businesses 102.

In addition, the consumer internal profile database 122 may also include consumer verification data. The consumer verification data may be provided during and/or following subscription to the VCDB system 100 for personalized services. Verification of consent by the consumer, and/or the participating businesses 102, to the release and use of consumer/customer information that may be needed to process requests may be provided by the consumer verification data. In addition, verification may involve determining the level of personalized services within the VCDB system 100 a consumer has purchased. Further, any other consumer specific information may be included within the consumer internal profile database 122.

The separate secure databases of the distributed database 104 may be located remotely or locally. Preferably, the participating communication provider database 114 and the participating company database 116 reside remotely within the firewalls of the corresponding participating businesses 102. The databases may be enabled for external access via technologies such as, for example, extensible markup language (XML), simple object (SOAP), common object request broker architecture (CORBA), hypertext transfer protocol (HTTP), hypertext markup language (HTML), remote message interface (RMI), Internet inter object request broker (ORB) protocol (IIOP) and/or any other proprietary/non-proprietary interface technologies. Alternatively, the participating communication provider database 114 and the participating company database 116 may be collocated locally with the shared participant database 118, the administrator 106 and/or themselves.

The administrator 106 may be one or more applications operating to oversee and direct operation of the VCDB system 100. Operation of the administrator 106 may occur on one or more server computers or other devices capable of communication with the participating businesses 102 and the distributed database 104. In general, the administrator 106 maintains the VCDB system 100 and acts as an interface to deliver personalized services to a consumer over electronic communication channels.

Two types of services may be leveraged with the VCDB system 100 using the administrator 106. The first type of services is pull services where content is provided based on incoming requests from consumers for customer specific information. Examples of pull services requests may include requests for an airline itinerary, a bank statement, an order status, a service schedule or any other customer specific information related to goods and/or services purchased by a consumer. The requests may be forwarded over electronic communication channels from wireless or wireline communication devices operated by consumers. The administrator 106 may receive such requests and utilize the distributed database 104 to authorize and format such requests with customer specific information. The formatted requests may then be forwarded to the appropriate participating business within the participating businesses 102. Based on the request, a response that includes customer specific information may be provided to the consumer who originated the request.

The second type of services is push services where content is provided to consumers based on incoming requests initiated by an external event and/or predetermined preferences of a consumer. Examples of push services requests may include requests for notification of consumer(s) regarding a delayed airline flight, a checking account overdraft, non-payment of a bill, backordered goods/services that are now available, or any other personalized notification related to the provision of goods and services by the participating businesses 102. Such requests may be received, authorized, formatted and forwarded by the administrator 106 to the identified consumer. The requests may be forwarded over an electronic communication channel to a communication device, such as, for example, a wireless communication device. The electronic communication channels may be selected based on predetermined instructions from the consumers.

Any participating business desiring interactions with customers via electronic communication channels may utilize the VCDB system 100. Since requests for pull services are handled by the VCDB system 100, incoming requests from consumers need not include sensitive customer specific information. In addition, incoming requests for push services for consumer notification need not include sensitive destination address information. Further sensitive customer information may remain with each of the participating businesses 102 within associated separate secure databases. Accordingly, customer information may remain within the "four walls" of each participating business that is collecting and using such information to provide goods and/or services. Utilizing the distributed database 104 and the administrator 106, however, personalized customer information and other services may be enabled for real-time secure external access by consumers via a common interface standard.

As used herein, the term "sensitive information" pertains to information considered by a consumer to be private and/or personal. In addition, "sensitive information" includes information considered by any of the participating businesses 102 to be confidential, proprietary and/or would otherwise provide a competitive advantage to competitors.

Figure 4:
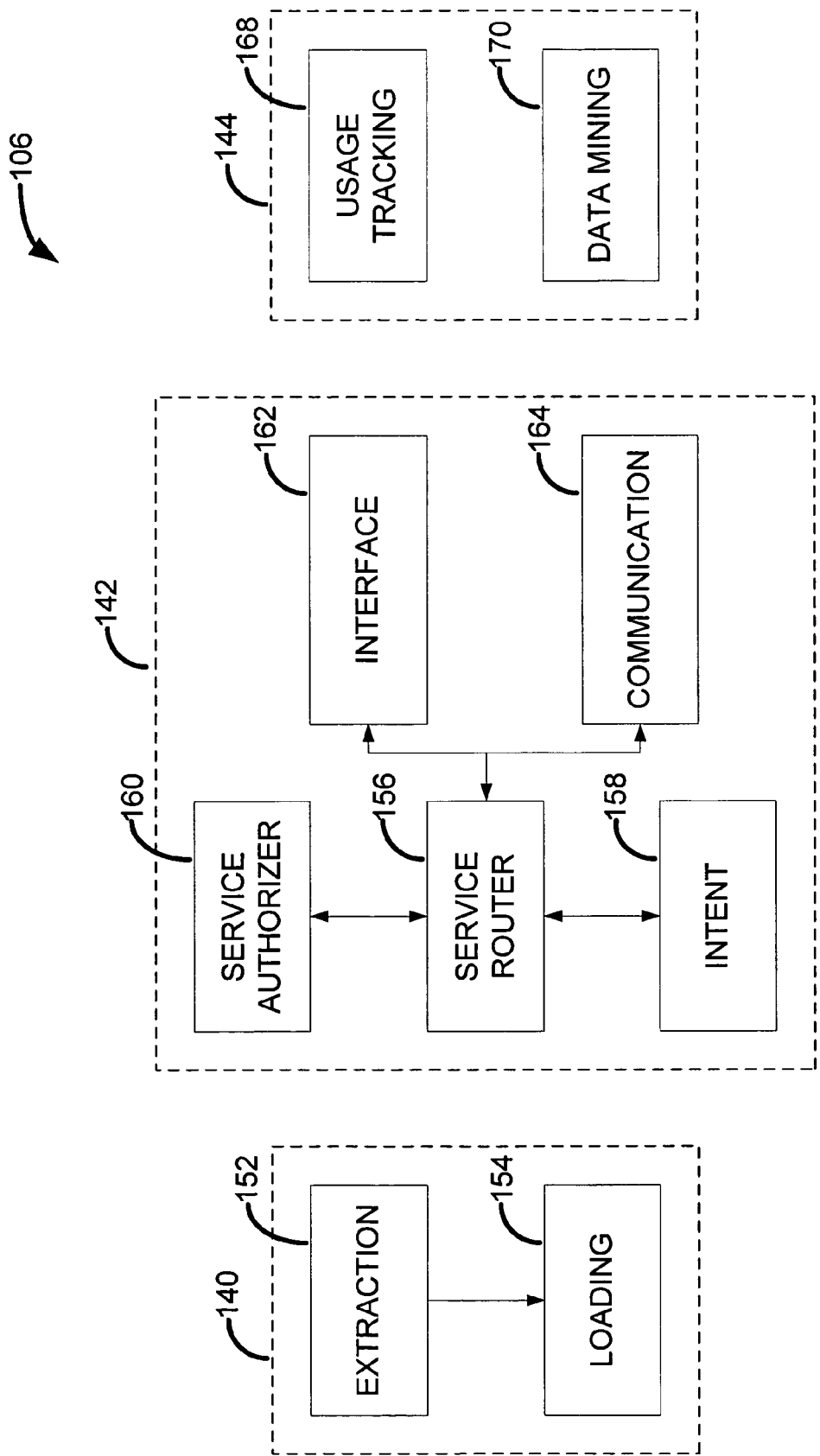
FIG. 4 is a block diagram of the administrator depicted in FIG. 1.

FIG. 4 is an example block diagram illustrating the functionality of the administrator 106 depicted in FIG. 3. The administrator 106 includes a load and scrub processing module 140, a request-handling module 142 and a transaction-monitoring module 144. In other examples, fewer or more modules may be illustrated to depict the functionality of the administrator 106.

The load and scrub processing module 140 includes an extraction component 152 and a loading component 154 cooperatively operating as illustrated. In general, the load and scrub processing module 140 directs the extraction and selective distribution within the distributed database 104 (FIG. 3) of customer information from the participating businesses 102 (FIG. 3). The term "load" refers to the insertion of records within the separate secure databases of the distributed database 104. The term "scrub" refers to the selective allocation of information to separate (or "scrub") sensitive information from non-sensitive information. The load and scrub processing module 140 may also include additional functionality such as, for example, data verification, removal of duplications, resolution of nicknames, misspellings, maiden/married name mapping, resolution of address spelling variants (e.g. "Cooper Lake Dr." and "Cooperlake Dr." or "Rain Tree Road" and "Rain Tree Rd") or any other processes related to selective data distribution within the distributed database 104.

Referring now to FIGS. 3 and 4, extraction of the customer information is performed with the extraction component 152. The extraction component 152 may communicate with each of the participating businesses 102 to obtain an extract of customer information. Each extract represents the customer information of one of the participating businesses 102, and may be identified with a corresponding company ID. The company ID may be provided along with the extracted customer information from each of the participating businesses 102. Alternatively, the extraction component 152 may be capable of identifying each of the participating businesses 102 and assigning the appropriate company ID. In another alternative, the extraction component 152 may cross reference the company name or other identifying information obtained in the extract with the shared participant database 118, or any other database, to identify the company ID.

The extract may include a customer name and a customer address associated with an internal customer ID. In addition, where the participating businesses 102 are a participating communication provider 110, enabled communication channel(s) may also be included in the extract. The customer name and address represent each customer of one of the participating businesses 102. The internal customer ID is an identifier to uniquely identify each customer, such as, for example, an account number, a frequent flier number (for an airline company) or any other way of uniquely identifying customers within a business' record keeping system.

The enabled communication channel(s) identify electronic communication channel(s) and device address(es) supported by the participating communication provider 110 for contacting the corresponding customer. For example, for a given customer the enabled electronic communication channels may include device addresses for an instant messaging address, an email address and a wireless phone number. In addition, any other information associated with uniquely identifying the communication channel(s) and corresponding device address(es) for a customer may be included in the extract. Any other customer related information may also be included in the extract, such as preferences for which method used to contact, schedules corresponding to which method of contact to use, length of message the device can receive (e.g. some mobile phones only accept 55 characters, some accept 255 characters).

Following extraction, the information within the extract may be compared by the extraction component 152 to a list of subscribing consumers. The list of subscribing consumers may be a listing of individuals currently enabled to utilize the VCDB system 100 for personalized services. Each entry in the listing of subscribing consumers may include a virtual key associated with the name(s) and current/past addresses of the individual. Alternatively, the virtual key may be associated with any other information indicative of the identity of a consumer that may be compared and selectively matched to the extracted information. The virtual key may be a unique hash code or other similar unique identifier that is a universal but anonymous identifier uniquely representing each consumer utilizing the personalized services of the VCDB system 100.

The extraction component 152 may query the consumer internal profile database 122 for the list of subscribing consumers. Alternatively, the extraction component 152 may maintain the list of subscribing consumers. In still other alternatives, the list of subscribing consumers may be stored elsewhere and accessed by the extraction component 152. The extraction component 152 may use the list of subscribing consumers to determine potential matches with the customer information contained in the extract. For each properly identified consumer in the extract, the extraction component 152 may associate the virtual key of the identified consumer with the corresponding customer information and activate the loading component 154.

The loading component 154 may selectively load information from the extract along with the associated virtual keys into the distributed database 104. The information may be selectively utilized by the loading component 154 to generate records that are inserted into one or more of the secure databases within the distributed database 104. The records generated by the loading component 154 may include public customer records and private customer records. Public customer records may include customer information of participating businesses 102, which is not sensitive or otherwise deemed confidential by the participating businesses 102. Private customer records, on the other hand, may include sensitive customer information.

Referring again to FIGS. 3 and 4, the loading component 154 may insert a public customer record into the consumer/company cross reference database 120 for each properly identified customer in the extract. The public customer record inserted by the loading component 154 may include the virtual key of the consumer associated with the company ID identified in the extract. Alternatively, any other data for cross-referencing the consumer to one of the participating businesses 102 from which customer information was extracted may be part of the public customer record.

In addition to loading public customer records, the loading component 154 may also load private customer records of properly identified consumers into the distributed database 104. The company ID associated with the extract may preferably be used to determine which secure database(s) within the distributed database 104 are loaded with private customer records. In addition, the company ID may preferably be used to determine the information content of the private customer records. Other factors, such as, other participating businesses, consumer preferences or any other parameters may also be included in the information content determination.

In the example illustrated in FIG. 3, if the extract was from the participating communication provider 110, the loading component 154 may generate and insert private customer records in the participating communication provider database 114. Based on the company ID of the participating communication provider 110, the private customer records preferably include the virtual key associated with the internal customer ID of each customer of the participating communications provider 110, along with the enabled communication channel(s). In addition, the company ID may be included in private customer records. The company ID may be included where the customer information in the participating communication provider database 114 includes information from multiple participating businesses 102.

If, on the other hand, the extract was from a participating company 108, for each properly identified customer, a private customer record may be generated and inserted in the participating company database 116. In this case, based on the company ID, the private customer record may include the virtual key associated with the internal customer ID for each customer of the participating company 108. Similar to the participating communication provider database 114, the company ID may also be include where information from multiple participating businesses 102 is included in the same participating company database 116.

Processing with the load and scrub processing module 140 may be repeated for each of the participating businesses 102. With the customer information extracted, scrubbed and loaded by the load and scrub processing module 140, the VCDB system 100 may utilize the distributed database 104 to provide personalized services. Personalized services may be provided in response to requests forwarded to the request-handling module 142.

Referring again to FIG. 4, the request-handling module 142 of the illustrated example includes a service router component 156, an intent component 158, a service authorizer component 160, an interface component 162 and a communication component 164 cooperatively operating as illustrated. The request-handling module 142 receives and processes requests for push and pull services. In addition, responses to requests may be formatted and forwarded by the request-handling module 142.

As previously discussed requests originating from consumers may be addressed by the pull services of the VCDB system 100 (FIG. 3). Consumers may initiate requests via an electronic communication channel using for example a wireless communication device. Electronic communication channels may include, for example, short message service (SMS), 2-way text, voice-interface to a voice recognition system, interactive messaging, a chat-system or any other mechanism for initiating a request. Alternatively, any other form of access channel may be used with wireless or wireline communication devices.

Requests over an electronic communication channel may also originate from an external event or preferences of the consumer as part of push services provided by the VCDB system 100 (FIG. 3). Such requests may originate from one of the participating businesses 102 (FIG. 3), in the form of, for example, information manually entered via a website and/or based on an automated request process triggered by events/data within the participating business. In addition, email messages, HTTP requests, or any other form of request for push services may be sent to the request-handling module 142. Such requests are received and processed by the service router component 156.

Referring once again to FIGS. 3 and 4, the service router component 156 receives requests and initiates queries of the distributed database 114 based on the requests. In addition, the service router component 156 activates the other components in the request-handling module 142 to process the requests. The service router component 156 may also perform other functions such as, for example, initiating and/or maintaining secure connections, such as, secure socket layer (SSL) communication with other devices in the VCDB system 100, maintenance of the secure databases and/or any other operationally related functionality of the VCDB system 100.

The service router component 156 may also process a request to identify an electronic communication channel for messages responsive to the request. An electronic communication channel identified in the request may be designated for messages responsive to the request. Alternatively, the electronic communication channel for responses may default to the channel the request was received from. In another alternative, the service router component 156 may query the consumer internal profile database 122 to determine a consumer designated electronic communication channel. In still other alternatives, any and/or all of the previously discussed channel identification mechanisms may be available.

Upon receipt of a request for pull services from a consumer, the service router component 156 may activate the intent component 158. The intent component 158 determines the nature of the request for pull services. Determination of the nature, or intent, of the request may allow identification of the company ID of the participating businesses 102 to which the request should be directed. The intent component 158 may utilize techniques such as, for example, natural language processing, keyword triggering processing, pre-defined menu choices and/or any other analysis mechanism for determining the intent of the request. Natural language processing allows a request in free-text, such as, for example, "What are the details of my flight?" With keyword trigger processing, pre-defined keywords may be identified in the request, such as, for example, "Itinerary." Pre-defined menu choices allow a choice from a list of pre-determined menu options.

Activation of the service authorizer component 160 by the service router component 156 may occur when requests for push and/or pull services are received. The service authorizer component 160 performs an authorization process. The authorization process may determine if the originator of the request has the necessary authorization level to make such a request.

Determination of the authorization level may involve verification of consent for the release and use of any customer information that may be needed to process and provide a response to the request. In addition, the level of access granted to individual consumers to obtain information from one of the participating businesses 102 responsive to requests may be determined. Further, verification may involve determining the level of personalized services to which a consumer has subscribed or agrees to subscribe. One such authorization level verification process for wireless communications device is disclosed by commonly assigned co-pending patent application to Portman et al. entitled SERVICE AUTHORIZER filed with the U.S. Patent Office on Oct. 3, 2002, and assigned application Ser. No. 10/263,566, which is herein incorporated by reference in its entirety.

The service authorizer component 160 may determine the authorization level based on the individual consumer making requests for pull services or intended to receive customer notification based on a request for push services. Upon receipt of a request, the service authorizer component 160 may access the consumer internal profile database 122 to verify the authorization level. The virtual key along with one of the participating businesses 102 identified by the intent component 158 may be utilized during the verification process. Alternatively, the service authorizer component 160 may include authorization level information, and/or may access any other database(s) containing such information.

The interface component 162 provides an interface to the participating businesses 102 for sending and receiving data and commands. Interfacing with the participating businesses 102 may involve formatting the request with, for example, proprietary communication protocols, HTTP, SOAP, IIOP, modem communications or any other communication protocol. In addition, interfacing may involve formatting the request in, for example, SQL, SOAP, CORBA, HTML, XML, RMI, C++, Cobol, text messages or any other format compatible with the participating businesses 102. The interface component 162 may include a plurality of interface sub-components. Each of the interface sub-components may provide an interface to one of the participating businesses 102. Accordingly, requests for pull services may be directed to a particular interface sub-component based on the identity of the participating business by the intent component 158.

The interface component 162 may similarly receive and format responses from the participating businesses 102. The responses may be provided by the participating businesses 102 in response to requests for pull services from consumers. In addition, requests for push services may be provided to the VCDB system 100 via the interface component 162.

The communication component 164 may provide the mode(s) of communication for messages to and from consumer communication devices based on identification of the electronic communication channel. Messages may include responses to request for pull services as well as customer notifications resulting from requests for push services. The communication component 164 may also place the messages on the identified electronic communication channel.

Providing the communication mode may involve, for example, creating text messages, alarms, video messages, audio messages and/or any other mechanism for conveying information based on identification of the return electronic communication channel. In addition, providing the communication mode may include protocol modification/changes, information presentation changes and/or other modifications/changes, based on the return electronic communication channel. One example technique for formatting a message in both text and/or audio messages during the course of a single interaction is to use multi-modal messaging. Alternatively, the communication component 164 may provide an interpretation and/or conversion function for both incoming requests from communication devices, as well as outgoing responses.

Referring once again to FIG. 4, the administrator 106 of the illustrated example also includes the transaction-monitoring module 144. In other examples, the transaction-monitoring module 144 may not be included in the administrator 106. The illustrated transaction-monitoring module 144 includes a usage-tracking component 168 and a data-mining component 170.

The usage-tracking component 168 may create an electronic record related to the processing of each request by the request-handling module 142. The electronic records may be stored in the shared participant database 118 (FIG. 3). Alternatively, electronic records for the participating businesses 102 (FIG. 3) or groups of participating businesses 102 may be stored in the participating communication provider database 114 (FIG. 3), the company database 116 (FIG. 3), a dedicated database (not shown) and/or any other location within the VCDB system 100 (FIG. 3).

When the request is for pull services, for example, the electronic record may include the virtual key of the relevant consumer, the date/time of the request and/or the response, the intent of the request and parameters of the request. In addition, the electronic record may include the company ID responding to the request, parameters of the response, the communication channel used for the request and the communication channel used for the response.

Similarly, when the request is for push services, the virtual key, the company ID, the date/time of the request and the communication channel may be included in an electronic record. Alternatively, the virtual key of the relevant individual may not be maintained in the electronic records. Instead, the electronic records of transactions may be fully anonymous from the consumer perspective. In addition, the company ID may be replaced with a company group ID to maintain anonymity of the participating businesses 102 (FIG. 3).

Referring once more to FIGS. 3 and 4, the data-mining component 170 may gather and process statistical data related to operation of the VCDB system 100. Operationally related data may be provided to the data-mining component 170 during operation of the VCDB system 100. The data-mining component 170 may be used to support the usage-tracking component 168 in gathering statistical data. Varying degrees of data mining with the data-mining component 170 may be used to determine, for example, how individual consumers and/or demographic categories of consumers are leveraging the supported personalized services of the VCDB system 100.

For example, demographic characteristics may be included in the consumer internal profile database 122. Transaction record data collected by the usage-tracking component 168 may then be mined by the data-mining component 170 based on the demographic characteristics. Any other operational data may also be gathered and processed by the data-mining component 170.

Figure 5:
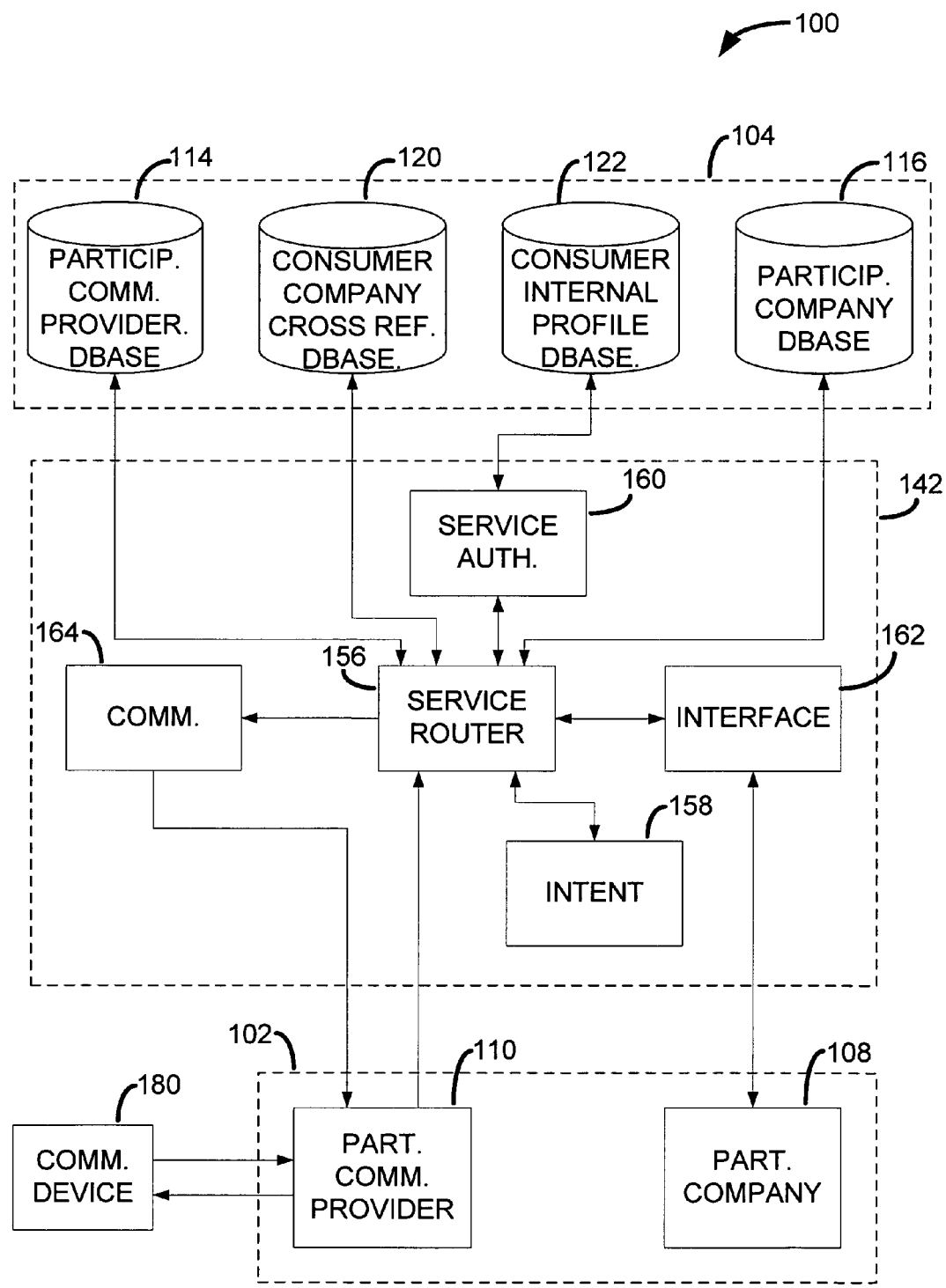
FIG. 5 is a more detailed block diagram of a portion of the virtual customer database system in FIG. 1.

FIG. 5 is a block diagram of an example the VCDB system 100 that may engage in push and/or pull services. In the illustrated example, the VCDB system 100 includes the participating businesses 102, the distributed database 104 and the request-handling module 142 operatively coupled as illustrated. In addition, at least one communication device 180 is depicted in the illustrated example as coupled with the participating businesses 102. The communication device 180 may be a wireless device and/or a wireline device. In the presently preferred embodiments, the communication device 180 is a wireless communication device.

The participating businesses 102 include at least one participating company 108 and at least one participating communication provider 110 similar to the previously discussed examples. In addition, the distributed database 104 is depicted as including the participating communication provider database 114, the participating company database 116, the consumer/company cross reference database 120 and the consumer internal profile database 122. The request-handling module 142 includes the previously discussed service router component 156, the intent component 158, the service authorizer component 160, the interface component 162 and the communication component 164.

Figure 6:
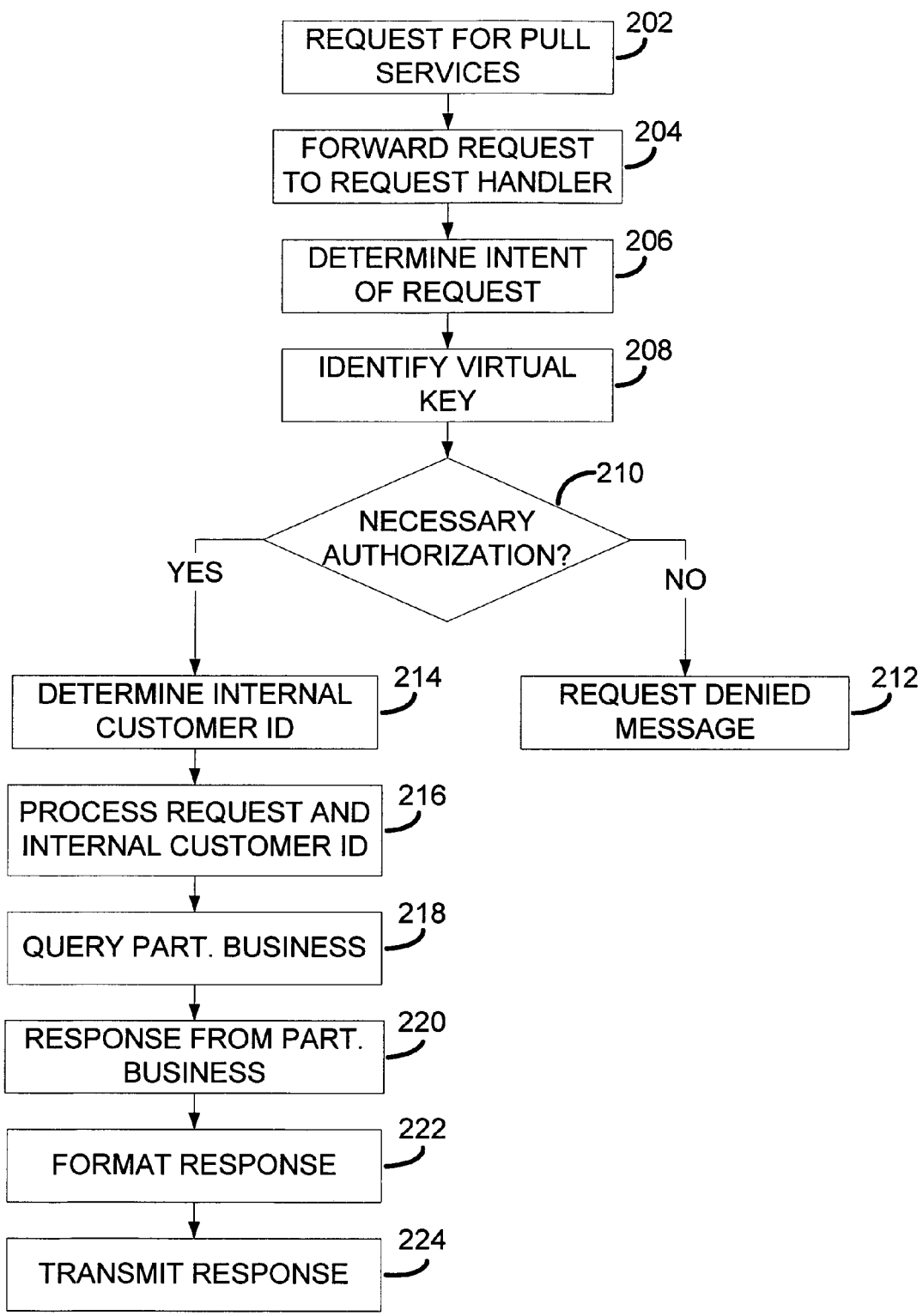
FIG. 6 is a flow diagram illustrating example operation of the portion of the virtual customer database system depicted in FIG. 3.

Referring now to the flow diagram of FIG. 6, an operational example of the VCDB system 100 illustrated in FIG. 5 will be explained when a request for pull services is received by the VCDB system 100. In this operational example, the previously discussed load and scrub processes have already occurred such that the VCDB system 100 is populated with data. The operation begins at block 202, where a request for pull services is forwarded from the communication device 180 of a consumer to the participating communication provider 110 over an electronic communication channel. At block 204, the participating communication provider 110 forwards the request to the request-handling module 142.

The service router component 156 processes the request and activates the intent module 158 to determine the intent of the request at block 206. At block 208, the service router component 156 queries the participating communication provider database 114 to determine the virtual key associated with the consumer based on the identification of the communication device 180 in the request. Once the virtual key and the intent of the request are identified, the service router component 156 activates the service authorizer component 160 to determine if the transaction has the necessary authorization level at block 210. The authorization level is determined by the service authorizer component 160.

If the necessary authorization level is not approved, a request denied message is returned to the communication device 180 via the participating communication provider 114 at block 212. If the necessary authorization level is denoted as approved, the service router component 156 queries the participating company database 116 in order to determine the internal customer ID associated with the previously identified virtual key at block 214. At block 216, the service router component 156 activates the interface component 162 based on the intent of the request and passes the request along with the internal customer ID to the interface component 162 for processing.

The interface component 162 queries the participating business, in this example, the participating company 108, to execute the consumer request at block 218. At block 220, the participating business generates a response to the request and forwards the response to the interface component 162. The response is formatted by the interface component 162, and forwarded to the communication component 164 via the service router component 156 at block 222. At block 224, the communication component 164 transmits the response back to the consumer on an electronic communication channel identified with the request and determined by the service router component 156.

Figure 7:
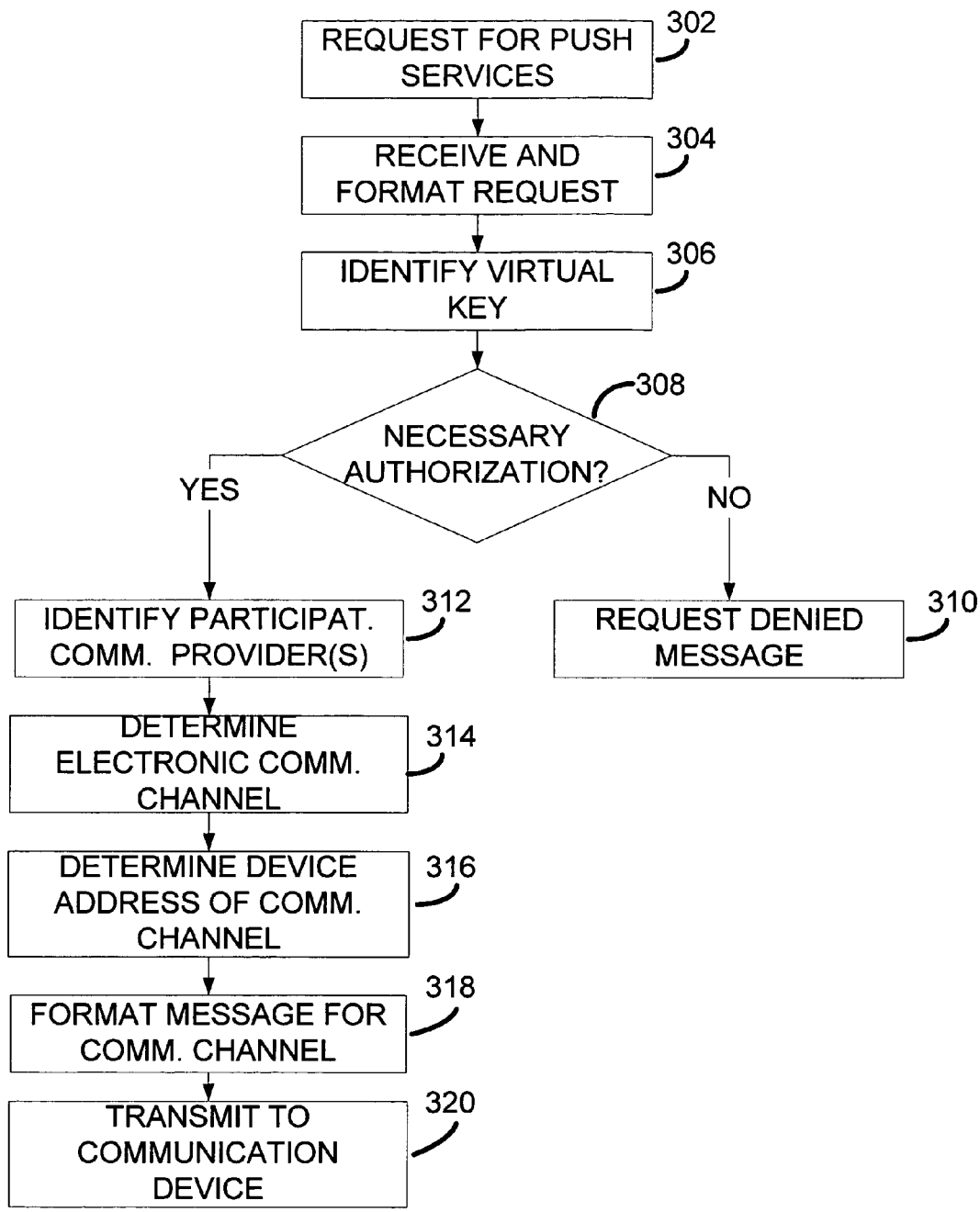
FIG. 7 is a flow diagram illustrating another example operation of the portion of the virtual customer database system depicted in FIG. 3.

Referring now to the flow diagram of FIG. 7, an operational example of the VCDB system 100 illustrated in FIG. 5 will be explained when a request for push services is received by the VCDB system 100. Similar to the operation described with reference to FIG. 6, the VCDB system 100 has previously been populated with data.

The operation begins at block 302, where a request for push services is forwarded from one of the participating businesses 102, in the illustrated example, the participating company 108, to the request-handling module 142. At block 304, the interface component 162 receives, processes, formats and forwards the request to the service router component 156. The service router component 156 queries the appropriate participating company database 116 to identify a virtual key at block 306 based on the company ID and the internal customer ID of the consumer identified in the request. At block 308, the service router component 156 activates the service authorizer component 160 to determine whether the transaction has the necessary authorization level.

If the authorization level is insufficient, a request denied message is returned via the interface component 162 to the originator of the request at block 310. If the authorization is denoted as approved, the service router component 156 utilizes the virtual key to query the consumer/company cross reference database 120 to identify participating communication provider(s) 110 available to provide communication services to the consumer at block 312. In addition, at block 314, the service router component 156 queries the consumer internal profile database 122 to determine which electronic communication channel should be used in this situation (based on time of day, business sending the message, importance of the message, etc.). In the illustrated example, the electronic communication channel for the communication device 180 associated with the company ID of the participating communication provider 110 is identified.

Following identification of the electronic communication channel, the service router component 156 queries the participating communication provider database 114 based on the company ID and the virtual key to determine the device address of the communication device 180 at block 316. At block 318, the service router component 156 activates the communication component 164 to format a message for the consumer appropriate for the identified electronic communication channel. The communication component 164 transmits the information to the communication device 180 based on the previously determined electronic communication channel and the preferences of the consumer at block 320.

The previously discussed VCDB system 100 may provide personalized services to consumers in the form of real-time external access to personalized customer data and related services. The personalized customer data and services may be provided from participating businesses 102 without requiring the participating businesses 102 to directly share customer data with each other. In addition, the VCDB system 100 acts as a liaison allowing consumers to request customer specific information without including identifying information specific to a participating business. Similarly, the participating businesses 102 may utilize the VCDB system 100 to successfully request notification of consumers without specification of the communication channels used for notification.

Information Assistance Using Multi-Modal Messaging

Figure 8:
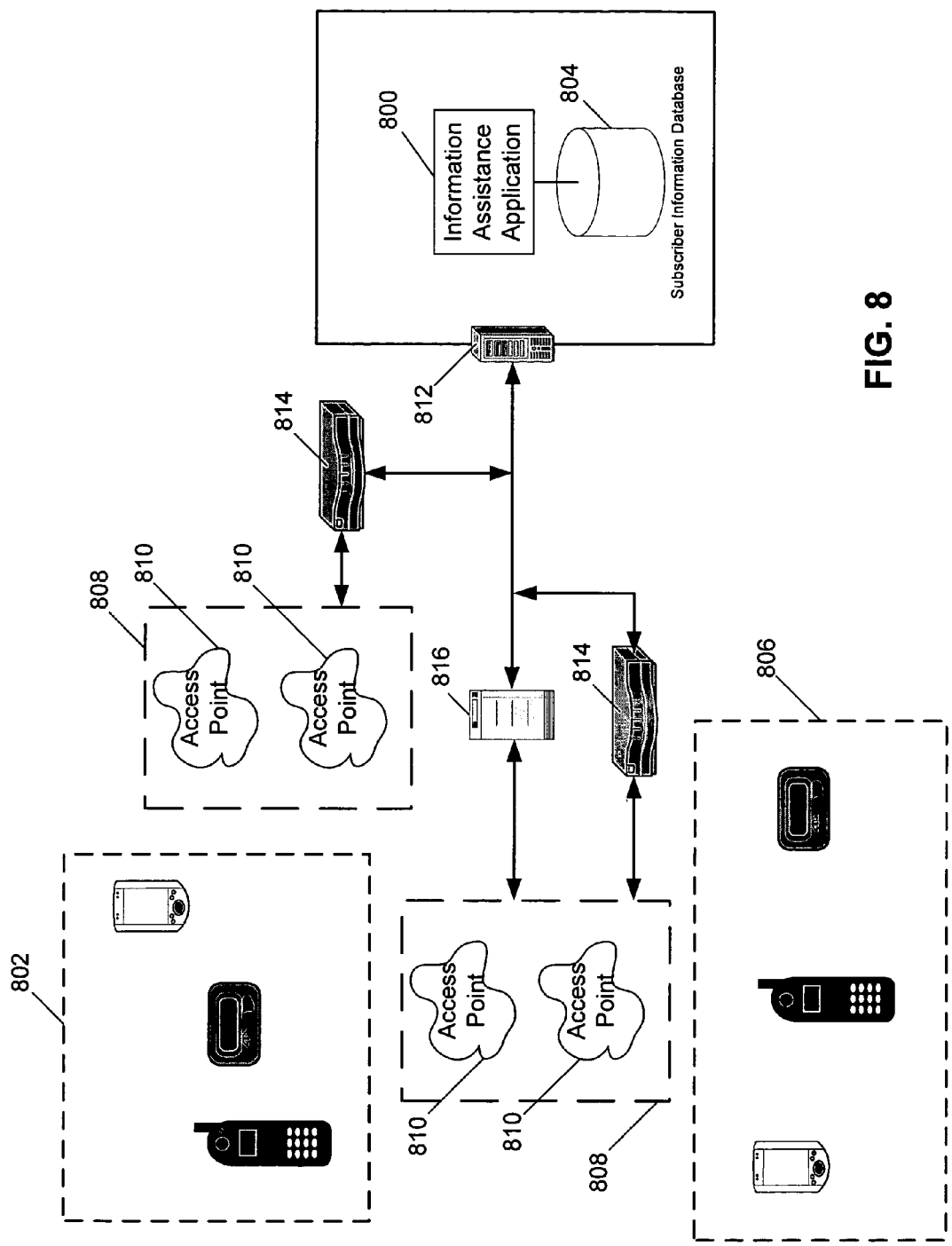
FIG. 8 illustrates a wireless communication system that includes an information assistance application.

Referring to FIG. 8, an embodiment of the present invention discloses a information assistance application 800 that may be used by one of a plurality of wireless requestor terminals 802 to obtain a subscriber information record from a subscriber database 804 associated with one of a plurality of subscriber terminals 806. The terminals 802, 806 may be connected to a wireless access network provider 808 that may have a plurality of access points 810 in various geographic locations. The access points 810 are designed to provide wireless service coverage to the terminals 802, 806. The wireless access network providers 808 may be connected with an information assistance application server 812 that may include at least a portion of the information assistance application 800. Those skilled in the art should recognize that the information assistance application 800 may be designed to run as a distributed process application that may store pieces of software modules of the information assistance application 800 on each device that takes advantage of the service.

The wireless access network providers 808 may be connected with at least one router 814 or at least one switching device 816 that may be used to transfer data to and from the information assistance application server 812. The access points 810 may be connected with the information assistance application server 812 using any conventional network connection devices and systems. Although not illustrated, the access points 810 may include a base station that is connected with a base station server that is used to control operation of the access points 810. The base station server may be connected with the information assistance application server 812 or various other network connection methods may be used.

Those skilled in the art should recognize that various methods and systems exist that may be set up or installed to operate as the access points 810.

Figure 9:
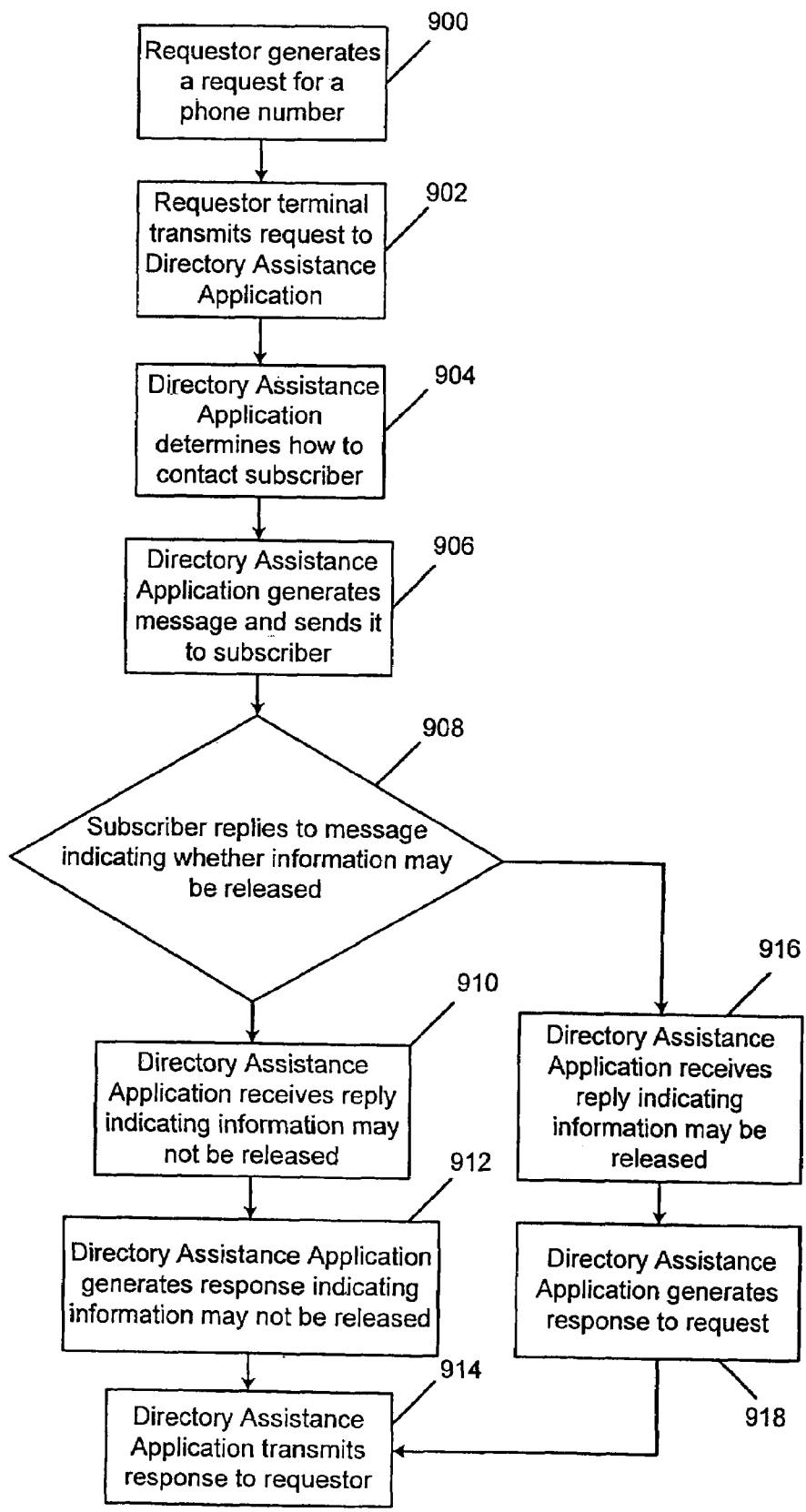
FIG. 9 is an exemplary flow chart of some of the process steps performed by the information assistance application.

Referring to FIG. 9, a flow chart is set forth that illustrates some of the exemplary process steps performed by the information assistance application 800 during operation. The present invention discloses a information assistance application 800 that allows a Requestor to generate and send the information assistance application 800 a request for contact information associated with a Subscriber assigned to a wireless access network provider 808. The Requestor uses the requestor terminal 802 to generate the request for contact information, which is illustrated at step 900. The request may be in the form of a text-based message or may also be a voice-based request. Once generated, at step 902 the request is transmitted to the information assistance application server 812. As such, the request may travel from the access point 810 to the information assistance application server 812.

At step 904, the information assistance application 800 applies logic to the request and determines how to contact the person or company (Subscriber) identified by the request. The information assistance application 800 may access the subscriber database 804 to locate the contact information associated with the Subscriber identified by the request. Once the Subscriber is identified or located, the information assistance application 800 generates a message that is sent to the Subscriber identified by the request, which is illustrated at step 906. The message may contain an information record associated with the Requestor that may identify the Requestor by name, mobile number, home number, work number, address, email address and so forth. The message may also contain information that clearly identifies to the Subscriber that the incoming message is a request for the release of contact information and an indicator that prompts the Subscriber for a response to the message.

As set forth above, at step 906 the subscriber terminal 806 is sent a message that requests permission to release their respective contact information to the Requestor. The message preferably reveals the identity of the Requestor to the Subscriber. The Subscriber may have predefined parameters indicating a preferred way to be contacted about releasing information and as such, the information assistance application 800 may also look to see if any of these parameters exist. For example, the Subscriber may only like to be contacted about releasing information through a short message service message or an email alert and so forth. In other words, the Subscriber may not prefer to receive a telephone call from a computer operator every time someone requests contact information. As such, the information assistance application 800 will allow a Subscriber to set up or program preferences about preferred ways in which he/she desires to be contacted.

Once the subscriber terminal 806 receives the message from the information assistance application server 812, the Subscriber may review the message contents and indicate whether or not to provide their contact information to the Requestor, which is illustrated at step 908. For example, the Subscriber may be prompted to press "7" on the keypad if he/she wants to provide the requested information or press "0" if he/she does not want to provide the requested information. If a voice recognition application is being used by the information assistance application 800, the Subscriber may be prompted by the information assistance application 800 to simply say "Yes" or "No" and so forth. If the Subscriber does not allow the Requestor to obtain his/her contact information, at step 910 the information assistance application 800 receives a reply having a flag set indicating not to provide the information to the Requestor. At that point, the information assistance application 800 generates a response indicating that the information requested by the Requestor will not be released, which is illustrated at step 912. After the response is generated, at step 914 it is transmitted to the requestor terminal 802.

If the Subscriber replies to the request for contact information by indicating that his/her contact information may be released or provided to the Requestor, at step 916 the information assistance application 800 receives a reply having a flag set to indicate that it is alright to provide the Requestor with the contact information. At step 918, the information assistance application 800 generates a response to the request that contains contact information that is releasable per the Subscriber. The Subscriber may have a profile that indicates the type of information that may be released. For example, the Subscriber may only want their mobile telephone number and/or email address released and not their home telephone number. At step 914, the response is transmitted from the information assistance application server 812 to the requester terminal 802. The response is preferentially generated as a multi-modal message that is sent to the Requestor terminal in at least two types of message formats, for example a voice-based response and a text-based response.

Figure 10:
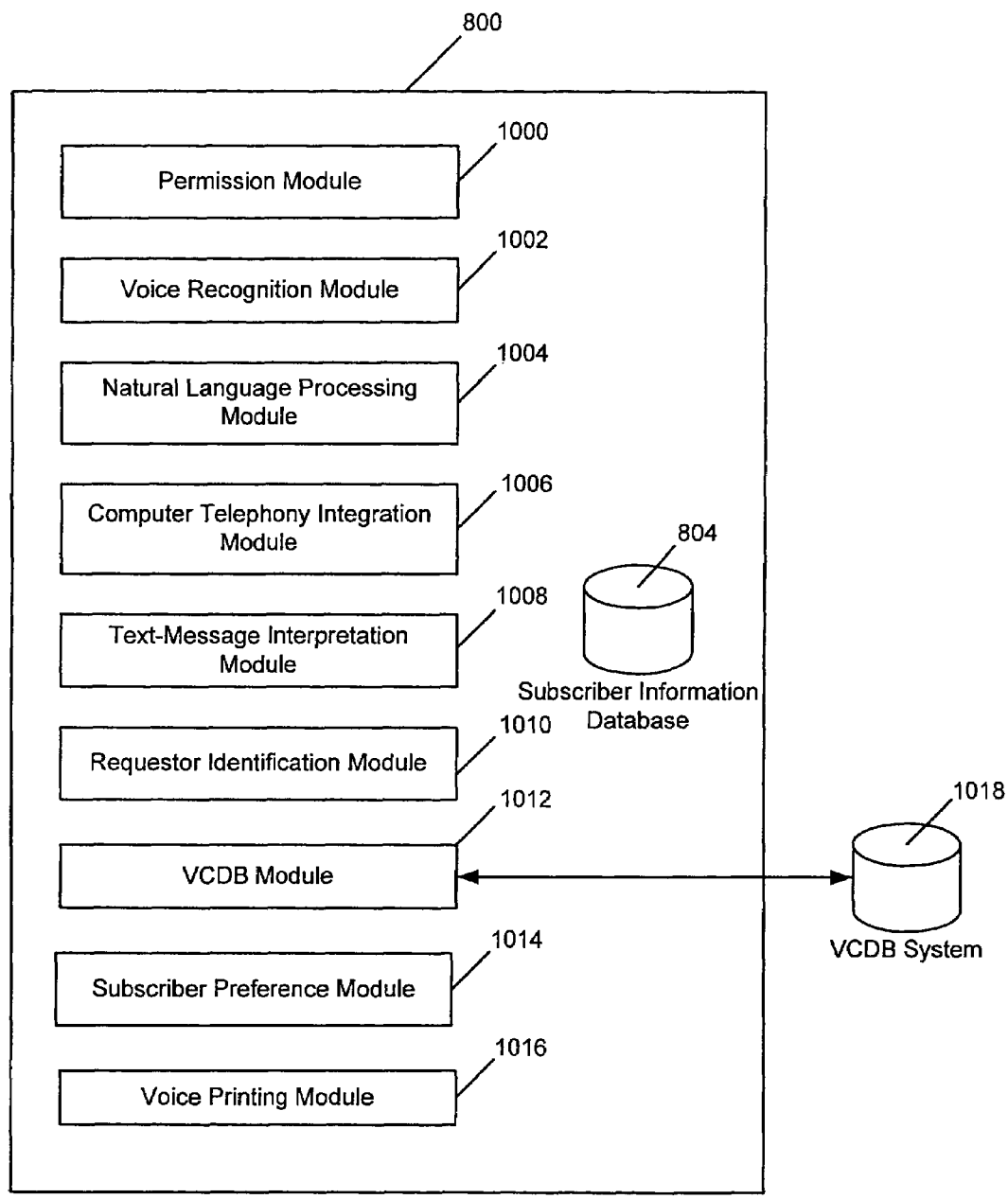
FIG. 10 is an exemplary block diagram of some of the software components or modules of the information assistance application.

Referring to FIG. 10, the information assistance application 800 may include a permission module 1000, a voice recognition module 1002, a natural language processing module 1004, a computer-telephony integration ("CTI") module 1006, a text-message interpretation module 1008, a requestor identification module 1010, a virtual customer database module 1012, a subscriber preference module 1014 and a voice printing module 1016. Generally speaking, the permission module 1000 controls the overall operation of the information assistance application 800 and interacts with the other modules to obtain data and transfer data to and from the requester terminal 802 and the subscriber terminal 806. The permission module 1000 is used to determine if the requestor terminal 802 is authorized to make the request for contact information, use the other modules to determine the contact information of the Subscriber, and pass the contact information on to the requestor terminal 802 if the Requestor is authorized to receive the data.

As set forth above, the present invention provides a method and system that enables a Requestor to place a phone call (or make some other type of request in a different format) to the information assistance application 800 and request a phone number (or other contact information) of another Subscriber who's terminal is also connected to a wireless communication system. The request may include one of the following, or some combination of the following information about the Subscriber: first name, last name, address, employer, home phone number, office phone number, Subscriber's wireless service provider, previous wireless phone number and/or wireless provider, other personal proprietary information and so forth. For example, the request message may comprise a message received in one of the following formats: "I need the wireless number for Mike Jones who has a XYZ Company wireless phone" or "I need the wireless number for Mike Jones who's home telephone number is 999-232-2231".

In order to make the request, the requestor terminal 802 may contain a information assistance application module, a link in a browser type interface, or a stored telephone number that allows the Requestor to enter or input the request, which contains information about the Subscriber. In one embodiment, the Requestor may place a telephone call to a predetermined number that routes the Requestor to the computer telephony integration module 1006 of the information assistance application 800. The computer telephony integration module 1006 may include a human Operator that listens to and interprets the request and enters data representing the request into a terminal using a keyboard, mouse, and or other human computer interface devices. In this embodiment of the invention, the information assistance application 800 would preferably employ the use of the computer telephony integration module 1006 to enable a screen-pop (a display of Requestor proprietary information on the Operator's terminal upon initial receipt of the call just prior to the Operator answering the call).

Preferably, the Requestor may speak to a computer system enabled with computer telephony integration to answer the telephone call and the voice recognition module 1002 to interpret the spoken request. In any embodiment of the invention that incorporates a spoken request interpreted by a computer application, the information assistance application 800 may include an integrated voice recognition module 1002 and a natural language processing module 1004 that interpret the spoken request. The natural language processing module 1004 allows the Requestor to use normal speech when making the request instead of replying to prompts. As such, the natural language processing module 1004 is designed to interpret natural spoken requests.

In another embodiment of the present invention, the Requestor operates the wireless or wired phone or terminal 802 to send a text message to the information assistance application 800. The information assistance application 800 may include a text-message interpretation module 1008 that may be used to interpret incoming text-based requests. The message may be sent via the Internet using any HTTP, STMP, or instant messaging protocol. If a wireless phone is used, a short message service (SMS) text message or other protocol and format may be used. The request may be entered using a wireless terminal 802 connected to a server running a WAP application. In the case that the written request is created using natural language, for example, "What is John Smith's wireless phone number?" or "Give me the wireless number of Jane Doe.", the information assistance application 800 will preferably use the text-message interpretation module 1008 and the natural language processing module 1004 to interpret the request and generate the message that is sent to the Subscriber.

In the preferred embodiment of the invention, as the request is sent from the requester terminal 802, some unique information about the requestor terminal 802 such as the serial number, requestor name, telephone number, or other such identifying information is sent with the request to aid in determining the identity of the Requestor. The requestor identification module 1010 of the information assistance application 800 may be used to determine the identification of the Requestor. In the case that the message is in the form of a spoken request, the information assistance application 800 may use a voice printing module 1016 to validate that the user of the requestor terminal 802 is the individual assigned to the requestor terminal 802 per the customer agreement with the wireless access network service provider 808, thus ensuring that when the request is delivered to the Subscriber, the Requestor's identity can be accurately represented. In addition, the voice printing module 1016 may be used to identify the Requestor.

After the request is received and initially processed, the permission module 1000 applies logic to determine how to contact the Subscriber. The permission module 1000 of the information assistance application 800 may have access to the subscriber database 804, which contains a plurality of contact information records about the Subscribers of various wireless access network service providers 808. The permission module 1000 may query the subscriber database 804 to locate the contact information record of the Subscriber in question and use the subscriber preference module 1014 to determine the appropriate way to contact the Subscriber.

The Requestor and the Subscriber may or may not use the same wireless network service provider 808. In the case that the Requestor and Subscriber's terminals 802, 806 are supported by different wireless network service providers 808 or in the case that the Requestor has made his/her information available only through a virtual customer database system 1018, the permission module 1000 may send a request to the virtual customer database system 1018 and use the methods described in the section entitled Virtual Customer Database above to determine how to contact the Subscriber. This allows the information assistance application 800, which may be owned and/or operated by the Requestor's service provider or a third party, to make a request to the virtual customer database system 1018 that will in turn release the appropriate information to the requesting system, or forward the request to a system owned and/or operated by the Subscriber's service provider. This enables the request to be processed without releasing the Subscriber's customer proprietary information per the preferences set by the Subscriber.

The permission module 1000 may determine that the Subscriber has set his/her permissions such that none of his/her customer proprietary information may be disclosed. The preferences may deny the Requestor specifically by name, by telephone number, or the preferences may deny the Requestor categorically using some other criteria such as the Requestor's employer, or other demographic information. The information assistance application 800 preferably uses the methods described in the section entitled Virtual Customer Database above to retrieve Requestor proprietary information or some representation of this data. The request therefore, may include Requestor proprietary information such as the Requestor's: first name, last name, address, home phone number, office phone number, employer, or other demographic information. For example, "This is Jane Barton with ABC Printing, and I need the wireless phone number of Joe Smith."

The permission module 1000 may also use the subscriber preference module 1014 to determine a preferred method for contacting the Subscriber based on preferences set by the Subscriber upon initiation of the permission service. These preferences may be stored in the subscriber database 804 or in a permission database made accessible using the methods described in the section above entitled Virtual Customer Database and may include a method of contact such as "text message to wireless phone", "email", "phone call", "voice mail", "instant message" and any combination of these contact methods with preferences depending on time of day and day of week/month and so forth. The subscriber preference module 1014 may be used to determine the preferred contact method of the Subscriber.

As set forth above, once the information assistance application 800 interprets the request, it generates and sends a message to the Subscriber's terminal 806 containing a request for authorization to provide the Subscriber's contact information (i.e.—phone numbers, email addresses, addresses, fax numbers and so forth) to the Requestor. The format, content, and transfer method of the message may be determined by the permission module 1000 and/or the subscriber preference module 1014. In addition, the format, content, and transfer method of the message may be determined using Subscriber proprietary information from the virtual customer database system 1018. This information may include preference information for method of contact by day of week, time of day, date and so forth. For example a Subscriber may prefer to receive a short message service ("SMS") message to their terminal during business hours from 8 a.m. to 6 p.m., and prefer to receive a voicemail to their terminal voice mailbox between 6 p.m. and 8 a.m. As such, the message may be transferred to the Subscriber's terminal 806 or storage method and account associated with the Subscriber's terminal 806 using the Subscriber proprietary information obtained from the virtual customer database system 1018.

In a preferred embodiment of the invention, the message sent to the Subscriber's terminal 806 includes the Requestor's name and/or other information unique to the Requestor so that the Subscriber will know who is requesting his/her information. In another preferred embodiment of the invention, the request for authorization to provide contact information to the Requestor includes a request to provide additional customer proprietary information about the Subscriber such as Full Name, Address, additional phone numbers, Employer's name and other information commonly shared amongst individuals to be stored in personal address books and/or personal contact information databases. The message may be sent to the Subscriber's terminal 806 using any one of the following methods or preferentially, using multi-modal messaging: SMS, email using SMTP or any other email format to an email addressable wireless terminal including handheld PCs, pagers or phones, instant message to a wired or wireless terminal, human or machine generated (using a text to speech module (not illustrated)) spoken message delivered to a voice messaging inbox associated with the Subscriber's wireless terminal 806 or through a call to the Subscriber's terminal 806.

The Subscriber replies to the text message indicating whether his/her information may be released to the Requestor using the subscriber terminal 806. Instead of replying by sending a text message, the Subscriber may place a phone call to a human operator using a computer enabled with CTI, or to a system enabled with CTI, voice recognition, and/or natural language processing that will interpret the spoken response of the Subscriber. The Subscriber may also use any method described in the section above entitled Multi-Modal Messaging.

The information assistance application 800 may use the permission module 1000 to receive and interpret the reply from the subscriber terminal 806. If the reply contains an indicator that authorizes the release of the Subscriber contact information, the permission module 1000 prepares a message that will be sent to the Requestor containing the appropriate contact information of the Subscriber. Again, the permission module 1000 may use the virtual customer database module 1012 to access the virtual customer database system 1018 to obtain the appropriate contact information. If the Subscriber does not authorize the release of information, the permission module 1000 prepares a response to be sent to the Requestor's terminal 802 indicating that the requested contact information will not be provided.

The permission module 1000 may communicate with other applications to send the message to the Requestor's terminal. The permission application 1000 may use a text-to-speech module to convert a text-based response into a voice-based response. In the preferred embodiment of the invention, the information assistance application 800 may send a message to the virtual customer database system 1018 such that the virtual customer database system 1018 is triggered to send the request to the Subscriber's wireless service provider's system 808. The information assistance application 800 may receive the response from the Subscriber using one of several different types of message formats, where the Requestor sends the initial request to the system.

In another preferred embodiment of the invention, the Requestor may be an individual or computer system representing a business and the information requested includes customer proprietary information as it relates to the Subscriber's account information with the wireless network service provider 808 or any other business such as an airline carrier, or financial institution. For example, if someone is a customer of a financial institution that provides credit cards to consumers, this company may choose to use this system to retrieve a subscriber's airline frequent traveler program identification number in order to provide the subscriber with some benefit for using the credit card to purchase tickets from the airline.

The present invention may advantageously take advantage of multi-modal messaging whenever a message or reply is sent to the terminals 802, 806 and/or the information assistance application 800. In addition, when information is needed, the present invention may also take advantage of the virtual customer database system 1018 to lookup or retrieve the appropriate data, to set permissions, preferences and so forth. As set forth above, the Requestor and/or the Subscriber may have preferences on the type of information that is given out or made available and the message format for the various types of messages sent and received.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method of providing information assistance to a wireless terminal, comprising the steps of:

receiving, from a wireless terminal operated by a requestor, a contact information request with an information assistance application located on an information assistance server, wherein the contact information request is a request for contact information of a user of a subscriber terminal that is other than the wireless terminal;

querying a participating communication provider database of a communication provider providing communication services to the wireless terminal to identify a virtual key of the requestor from unique information of the wireless terminal included with the contact information request, the virtual key being a universal anonymous identifier of the requestor that is shared among a plurality of different participating businesses;

accessing a consumer internal profile database containing verification data of the requestor and proprietary information of the requestor with the virtual key of the requestor, the verification data providing verification of consent by the requestor of release and use of the proprietary information of the requestor;

accessing permissions of the user of the subscriber terminal with the information assistance application to determine if the contact information request should be automatically denied categorically or specifically, based on the proprietary information of the requestor obtained from the consumer internal profile database with the virtual key of the requestor;

determining a contact preference for how to contact the subscriber terminal about the received contact information request with the information assistance application only when the information request is determined as not being automatically denied;

generating an authorization request to request permission from the subscriber terminal to provide the contact information of the user of the subscriber terminal to the wireless terminal, wherein the authorization request includes an indication of an identity of the requestor based on the proprietary information of the requestor;

transmitting the authorization request to the subscriber terminal in accordance with the determined contact preference;

receiving a reply from the subscriber terminal indicative of whether or not the requested information record is permitted to be provided to the wireless terminal;

accessing the consumer internal profile database to determine pre-determined contact parameters of the requestor based on the virtual key of the requestor; and generating a response for transmittal to the wireless terminal when the reply is indicative of permission to proceed with provision of the requested contact information of the user to the wireless terminal, the response including only contact information identified by the user of the subscriber terminal as permissible to send to the wireless terminal, the response generated in accordance with the format preferences of the requestor.

2. The method of claim 1, further comprising the step of transmitting the generated response to the wireless terminal.

3. The method of claim 1, wherein the response comprises a multi-modal message that includes both a voice-based response and a text-based response generated during a single interaction in accordance with the pre-determined contact parameters of the requestor.

4. The method of claim 3, further comprising transmitting the voice-based response and the text-based response sequentially to the wireless terminal in accordance with the pre-determined contact parameters.

5. The method of claim 1, wherein the request includes at least one information record item about the subscriber terminal selected from a group of information record items comprising a first name, a last name, an address, an employer, a home phone number, an office number, a subscriber's wireless service provider, a previous wireless phone number, or a previous wireless provider.

6. The method of claim 1, wherein receiving, from a wireless terminal, a contact information request comprises interpreting the contact information request with a voice recognition module when the contact information request is a spoken request.

7. The method of claim 6, wherein interpreting the contact information request comprises further interpreting the contact information request with a natural language processing module.

8. The method of claim 6, wherein interpreting the contact information request comprises authenticating the requestor with a voice print application.

9. The method of claim 1, wherein the request comprises a text message.

10. The method of claim 1, wherein determining a contact preference comprises the information assistance application querying a virtual customer database system.

11. The method of claim 10, wherein, querying a virtual customer database system comprises accessing a customer proprietary information record having customer contact data that includes a contact preference, the customer proprietary information record associated with the subscriber terminal.

12. The method of claim 1, wherein generating a response further comprises interpreting the reply from the subscriber terminal, and generating a multi-modal response for transmission to the wireless terminal in accordance with the pre-determined contact parameters of the requestor.

13. The method of claim 1, wherein generating an authorization request comprises generating the authorization request in accordance with the determined contact preference.

14. The method of claim 1, wherein receiving a reply from the subscriber terminal comprises receiving an indication in the reply of information from among the contact information that is permitted to be provided to the wireless terminal of the requestor.

15. The method of claim 1, wherein receiving a reply from the subscriber terminal comprises accessing a profile associated with the user of the subscriber terminal to determine what portion of information from the contact information is permitted to be provided to the wireless terminal of the requestor.

16. The method of claim 1, wherein identifying the requestor comprises authenticating the requestor and verifying the requestor is authorized to make the contact information request.

17. The method of claim 1, wherein generating an authorization request comprises including a response mechanism in the authorization request that enables approval or disapproval of the request for the contact information and indication of information to be provided from the contact information.

18. The method of claim 1, wherein receiving, from a wireless terminal operated by a requestor, a contact information request comprises receiving a voice-based request in a natural language format, and converting the voice-based request to text with a voice recognition module to identify words, and a natural language processing module to identify the intent or meaning of the words.

19. The method of claim 1, wherein the communication service provider of the requestor is a first communication service provider, and the user of the subscriber terminal is provided communication services from a second communication services provider that is different than the first communication services provider.

20. The method of claim 1, wherein the proprietary information comprises a name and address of the requestor, consumer specific contact information of the requestor, and pre-determined contact preferences of the requestor.

21. The method of claim 20, wherein the consumer specific contact information of the requestor comprises indication of different electronic communication channels and the p re-determined contact preferences of the requestor comprise preference rankings of the different electronic communication channels.

22. The method of claim 1, wherein the contact information request is automatically denied categorically when the requestor is identified from the proprietary information of the requestor as being within a group defined by criteria set by the user of the subscriber terminal.

23. The method of claim 1, wherein the verification data is indicative of a level of services the requestor has purchased.

24. A computer readable medium storing a computer program for providing information assistance to a wireless terminal in a wireless communication system, comprising:

a code segment that receives a contact information request message specifically requesting a phone number associated with a subscriber terminal, the request generated with a wireless terminal that is other than the subscriber terminal by a requestor that is other than a user of the subscriber terminal;

a code segment to query a participating communication provider database of a communication provider providing communication services to the wireless terminal to identify a virtual key of the requestor from unique information included within the contact information request, the virtual key being a universal anonymous identifier of the requestor that is shared among a plurality of different participating businesses;

a code segment to access, using the virtual key of the requestor, a consumer internal profile database containing verification data of the requestor and proprietary information of the requestor;

a code segment to verify, with the verification data, consent of the requestor to release and use of the proprietary information of the requestor;

a code segment responsive to the contact information request that determines how to contact the subscriber terminal;

a code segment that generates an authorization request for permission to provide the phone number associated with the subscriber terminal to the wireless terminal, wherein the authorization request includes at least a portion of the proprietary information of the requestor from the consumer internal profile database;

a code segment that transmits the authorization request to the subscriber terminal;

a code segment that interprets a reply from the subscriber terminal to determine if permission to provide the phone number associated with the subscriber terminal to the wireless terminal was granted;

a code segment to determine from the consumer subscriber database based on the virtual key of the requestor, a communication preference of the requestor and compatibility settings of the wireless terminal; and a code segment that generates a response to the wireless terminal that includes the phone number associated with the subscriber terminal when permission is granted, the response generated in accordance with the communication preference and the compatibility settings.

25. The computer readable medium of claim 24, further comprising a code segment that transmits the response to the wireless terminal in accordance with the communication preference and the compatibility settings.

26. The computer readable medium of claim 24, wherein the response comprises a multi-modal message that includes both a voice-based response and a text-based response as indicated in the consumer subscriber database as the communication preference.

27. The computer readable medium of claim 24, wherein the code segment that receives a contact information request message is configured to include a code segment that interprets the contact information request message with voice recognition to determine that the request is specifically for a phone number and to decipher information included in the information request message that is useable to identify the subscriber terminal when the contact information request is a verbal request.

28. The computer readable medium of claim 24, wherein the code segment that receives a contact information request message is configured to include a code segment that performs voice recognition and natural language processing to interpret that the contact information request message is specifically for a phone number when the contact information request is a verbal request.

29. The computer readable medium of claim 24, wherein the request comprises a text message.

30. The computer readable medium of claim 24, wherein the code segment that receives a contact information request message is configured to include a code segment that performs voice print analysis to determine the identity of the requestor when the contact information request is a verbal request.

31. The computer readable medium of claim 24, wherein the code segment responsive to the contact information request message that determines how to contact the subscriber terminal is configured to include a code segment that accesses a virtual customer database system to determine how to contact the subscriber terminal.

32. The computer readable medium of claim 24, wherein the code segment that interprets a reply from the subscriber terminal to determine if permission to provide the phone number associated with the subscriber terminal to the wireless terminal was granted further comprises a code segment to determine whether the user of the subscriber terminal has specified provision to the wireless terminal of additional contact information of the user of the subscriber terminal, and wherein the response also includes any additional contact information specified by the user of the subscriber terminal.

33. A system for providing information assistance to a wireless terminal, comprising:

an information assistance application server;

the information assistance application server operable to run an information assistance application that is configured to generate a webpage comprising input fields configured to receive a contact information request from a wireless terminal operated by a requestor for an information item associated with a subscriber terminal other than the wireless terminal;

a virtual customer database system in communication with the information assistance application server, the virtual customer database comprising a communication provider database of a communication provider providing communication services to the wireless terminal and a consumer internal profile database comprising verification data of the requestor and proprietary information of the requestor;

the information assistance application server further configured to generate a query to the virtual customer database system comprising unique information included with the contact information request;

the virtual customer database system configured to query the participating communication provider database to determine a virtual key of the requestor based on the unique information, the virtual key being a universal anonymous identifier of the requestor that is shared among a plurality of different participating businesses;

the virtual customer database system further configured determine if the proprietary information of the requestor is available for release based on the verification data, and in response to the proprietary information being available for release, the virtual customer database system further configured to provide the proprietary information to the information assistance application server, the proprietary information comprising a name of the requestor and specific contact information of the requestor, the specific contact information indicative of preferred communications channels of the requestor and contact parameters for the preferred communication channels of the requestor;

the information assistance application further configured to determine how to contact the subscriber terminal as a function of a contact preference associated with the subscriber terminal;

the information assistance application further configured to generate an authorization request to request authorization from the subscriber terminal to provide the information item associated with the subscriber terminal to the wireless terminal, wherein the authorization request includes the name of the requestor;

the information assistance application further configured to initiate transmission of the authorization request and the selectable option to the subscriber terminal;

the information assistance application further configured to receive from the subscriber terminal a reply to the authorization request indicating whether or not to provide the information item to the wireless terminal; and the information assistance application further configured to generate the response message for the wireless terminal that includes only information from the information item that is specified by a user of the subscriber terminal, the response message generated when the reply indicates the information item is to be provided, wherein the response message is generated in accordance with the preferred communications channels and contact parameters of the requestor.

34. The system of claim 33, wherein the information assistance application is further configured to initiate transmission of the response message to the wireless terminal.

35. The system of claim 33, wherein the information assistance application is further configured to generate the response message to include a multi-modal message that includes both a voice-based response and a text-based response based on the preferred communications channels and contact parameters of the requestor.

36. The system of claim 35, wherein the information assistance application is further configured to generate the authorization request to include a multi-modal message that includes both a voice-based request and a text-based request.

37. The system of claim 33, wherein the information assistance application is further configured to generate the authorization request as a function of the contact preference.

38. The system of claim 33, wherein the information assistance application is further configured to generate the authorization request to include an indicator that prompts a user of the subscriber terminal for a response.

39. A method of providing information assistance to a wireless terminal, comprising the steps of:

receiving, from a wireless terminal, a contact information request with an information assistance server, wherein the contact information request is a request for an information record associated with a consumer subscriber that is other than a user of the wireless terminal;

querying a first participating communication provider database of a first communication provider providing communication services to the wireless terminal to identify a first virtual key of the user of the wireless terminal based on unique information of the wireless terminal included with the contact information request, the first virtual key being a universal anonymous identifier of the user of the wireless terminal that is shared among a plurality of different participating businesses;

accessing a consumer internal profile database containing verification data of the user and proprietary information of the user with the first virtual key, the verification data providing verification of consent by the user of release and use of the proprietary information of the user;

querying a consumer cross reference database to identify a second virtual key of the consumer subscriber identified in the contact information request;

accessing the consumer subscriber database with the second virtual key to determine a user specific contact preference and a user specific message format for the consumer subscriber;

transmitting for receipt by a subscriber terminal determined to be a contact preference of the consumer subscriber an authorization request that includes at least a portion of the proprietary information of the user, the authorization request comprising a multi-modal message that includes both a voice-based request and a text-based request in accordance with the user specific message format, wherein the authorization request is to request permission from the subscriber terminal to provide the information record to the wireless terminal;

receiving a reply from the subscriber terminal indicative of whether or not the requested information record is permitted to be provided to the wireless terminal;

accessing the consumer internal profile database with the first virtual key to determine a requestor specific contact preference and a requestor specific message format for the wireless terminal, the requestor specific contact preference and the requestor specific message format prestored in the consumer internal profile database in association with the virtual key of the user; and generating a response message for the wireless terminal, the response message comprising a multi-modal message that includes both a voice-based response and a text-based response in accordance with the requestor specific message format and the requestor specific contact preference.

40. The method of claim 39, further comprising transmitting to the wireless terminal the voice-based response, followed in sequence by the text-based response.

* * * * *

UNITED STATES PATENT AND TRADEMARK OFFICE
CERTIFICATE OF CORRECTION

| | | |
|---|---|---|
| PATENT NO. | : 7,640,006 B2 | Page 1 of 1 |
| APPLICATION NO. | : 10/751022 | |
| DATED | : December 29, 2009 | |
| INVENTOR(S) | : Eric A. Portman et al. | |

It is certified that error appears in the above-identified patent and that said Letters Patent is hereby corrected as shown below:

In the Claims

In Column 8, line 21, delete "may" before "10" and insert --may-- after "10".

In Column 19, line 25, delete "include" and insert --included--.

In Column 24, line 52, delete "nm" and insert --run--.

In Column 24, line 53, delete "of" and insert --or--.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,640,006 B2 | Page 1 of 1 |
| APPLICATION NO. | : 10/751022 | |
| DATED | : December 29, 2009 | |
| INVENTOR(S) | : Eric A. Portman et al. | |

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 452 days.

should read (*) Notice: Subject to any disclaimer, the term of this patent is extended or adjusted under 35 U.S.C. 154(b) by 877 days.

Signed and Sealed this

Third Day of August, 2010

David J. Kappos
*Director of the United States Patent and Trademark Office*